US012053912B2

(12) United States Patent
Lee et al.

(10) Patent No.: US 12,053,912 B2
(45) Date of Patent: Aug. 6, 2024

(54) EXTRUDING SYSTEM AND METHOD OF EXTRUDING A MIXTURE OF A POLYMERIC MATERIAL AND A BLOWING AGENT

(71) Applicant: KING STEEL MACHINERY CO., LTD., Taichung (TW)

(72) Inventors: Yi-Chung Lee, Taichung (TW); Liang-Hui Yeh, Taichung (TW); Ching-Hao Chen, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 84 days.

(21) Appl. No.: 16/950,680

(22) Filed: Nov. 17, 2020

(65) Prior Publication Data
US 2022/0009137 A1    Jan. 13, 2022

Related U.S. Application Data

(60) Provisional application No. 63/063,425, filed on Aug. 9, 2020, provisional application No. 63/051,216, filed on Jul. 13, 2020.

(51) Int. Cl.
*B29C 44/60* (2006.01)
*B29C 44/34* (2006.01)
*B29C 44/42* (2006.01)

(52) U.S. Cl.
CPC .......... *B29C 44/3446* (2013.01); *B29C 44/42* (2013.01); *B29C 44/60* (2013.01)

(58) Field of Classification Search
CPC ... B29C 48/388; B29C 48/385; B29C 44/425; B29C 44/60; B29C 44/3446
See application file for complete search history.

(56) References Cited

U.S. PATENT DOCUMENTS 4,767,301 A    8/1988   Volk, Jr.
6,602,063 B1 *  8/2003   Cardona ................. B29C 44/60
                                                    425/557

(Continued)

FOREIGN PATENT DOCUMENTS

CN    207014652 U    2/2018
CN    109776848 A    5/2019

(Continued)

OTHER PUBLICATIONS

Extended Search Report dated Nov. 2, 2021 issued by the European Patent Office for the EP counterpart application No. 21173592.3-1014.

(Continued)

*Primary Examiner* — Alison L Hindenlang
*Assistant Examiner* — Debjani Roy
(74) *Attorney, Agent, or Firm* — WPAT Law; Anthony King

(57) ABSTRACT

An extruding system includes a mixing unit configured to mix a polymeric material with a blowing agent and to form a mixture, and an injection unit coupled to the mixing unit and configured to inject the mixture. The mixing unit includes a mixing cartridge, a first mixing screw and a second mixing screw, the first and second mixing screws are disposed in the mixing cartridge. A method of extruding a mixture includes mixing a polymeric material and a blowing agent in a mixing cartridge of a mixing unit by at least one of a first and second mixing screws to form the mixture; conveying the mixture from the mixing unit to an injection unit; and discharging the mixture from the injection unit into a molding device. The mixture is sequentially in contact with the first mixing screw and the second mixing screw.

21 Claims, 16 Drawing Sheets

(56) References Cited

U.S. PATENT DOCUMENTS

| | | | | |
|---|---|---|---|---|
| 2006/0138690 | A1* | 6/2006 | Schwaiger | B29C 48/92 425/149 |
| 2006/0172039 | A1* | 8/2006 | Imai | B29C 45/64 425/595 |
| 2015/0336307 | A1* | 11/2015 | Yamamoto | B29C 44/3446 264/40.4 |
| 2016/0101546 | A1* | 4/2016 | Gneuss | B29C 48/385 264/53 |
| 2017/0225360 | A1* | 8/2017 | Kobayashi | B29B 7/489 |
| 2018/0339439 | A1* | 11/2018 | Yusa | B29C 44/3446 |

FOREIGN PATENT DOCUMENTS

| | | |
|---|---|---|
| CN | 209191246 U | 8/2019 |
| EP | 1144490 A1 | 10/2001 |
| EP | 1815962 A1 | 8/2007 |
| EP | 3392014 A1 | 10/2018 |
| EP | 3412423 A1 | 12/2018 |
| JP | S6337915 A | 2/1988 |
| JP | H06166081 * | 6/1994 |
| JP | H06166081 A | 6/1994 |
| JP | 2000084968 A | 3/2000 |
| JP | 2002-530497 A | 9/2002 |
| JP | 2002-293975 A | 10/2002 |
| JP | 2007-230087 A | 9/2007 |
| JP | 2007276321 A | 10/2007 |
| KR | 10-1996-0003929 A | 2/1996 |
| TW | 201020092 A | 6/2010 |
| TW | 201943539 A | 11/2019 |

OTHER PUBLICATIONS

Decision of Rejection and Cited References dated Jun. 29, 2022 issued by the Taiwan Intellectual Property Office for the corresponding Taiwanese patent application No. 110117594.

Office Action, Cited References and Search Report dated Apr. 11, 2022 issued by the Taiwan Intellectual Property Office for the corresponding Taiwanese patent application No. 110117594.

Office Action, Cited References and Search Report dated Apr. 26, 2022 issued by the Japan Patent Office for the corresponding Japanese patent application No. 2021-066006.

Office Action, Cited References and Search Report dated May 12, 2023 issued by the Taiwan Intellectual Property Office for the Taiwan Counterpart Application No. 110117594.

Office Action, Cited References and Search Report dated Feb. 21, 2023 issued by the Japan Intellectual Property Office for the Japan Counterpart Application No. 2021-066006.

Notice of Last Preliminary Rejection dated Mar. 30, 2023 issued by the Korean Intellectual Property Office (KIPO) for the Korean application No. 10-2021-0061221.

Notice of Amendment Dismissal dated Feb. 16, 2024 issued by the Korean Intellectual Property Office (KIPO) for the Korean application No. 10-2021-0061221.

* cited by examiner

EXTRUDING SYSTEM AND METHOD OF EXTRUDING A MIXTURE OF A POLYMERIC MATERIAL AND A BLOWING AGENT

CROSS-REFERENCE TO RELATED APPLICATION

This application claims priority of U.S. provisional application Ser. No. 63/051,216, filed on Jul. 13, 2020, and U.S. provisional application Ser. No. 63/063,425, filed on Aug. 9, 2020, both of which are incorporated by reference in their entirety.

TECHNICAL FIELD

The present invention is related to an extruding system and an extruding method, and, in particular, to an extruding system and a method of extruding a mixture of a polymeric material and a blowing agent.

BACKGROUND

A substance is in a supercritical fluid state when it is in an environment having a temperature and pressure above its critical temperature and pressure. Such supercritical fluid is between a gas phase and a liquid phase in nature, has surface tension, viscosity and diffusivity similar to those of a gas, and has density and solvation ability close to those of a liquid. Therefore, in the prior art, by melting a solid-polymer raw material in a high-temperature and high-pressure environment provided by a mixing cartridge, a supercritical fluid may be mixed into a mixture, and by using a pressure drop between the mixing cartridge and the cavity of a mold, after the supercritical fluid enters the cavity, a plurality of nucleating points are formed in the mixture and grow into air bubbles, such that the mixture is molded into a foamed polymer article.

In view of the foregoing, the quality of the mixture directly affects the quality of the foamed polymer article. Therefore, it is necessary to improve the quality of the mixture.

BRIEF SUMMARY OF THE INVENTION

One purpose of the present invention is to provide an extruding system and a method of extruding a mixture.

According to one embodiment of the present disclosure, an extruding system is disclosed. The extruding system includes a mixing unit configured to mix a polymeric material with a blowing agent and to form a mixture of a polymeric material and a blowing agent, wherein the mixing unit includes: a mixing cartridge; a first mixing screw disposed in the mixing cartridge; and a second mixing screw disposed in the mixing cartridge. The extruding system further includes an injection unit coupled to the mixing unit and configured to inject the mixture.

According to one embodiment of the present disclosure, a method of extruding a mixture of a polymeric material and a blowing agent is disclosed. The method of extruding a mixture includes conveying the polymeric material from an inlet to a mixing unit; conveying the blowing agent into the mixing unit; and mixing the polymeric material with the blowing agent in a mixing cartridge of the mixing unit by a first mixing screw and a second mixing screw to form the mixture. The method further includes conveying the mixture from the mixing unit to an injection unit; and discharging the mixture from the injection unit into a molding device. The mixture is sequentially in contact with the first mixing screw and the second mixing screw.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
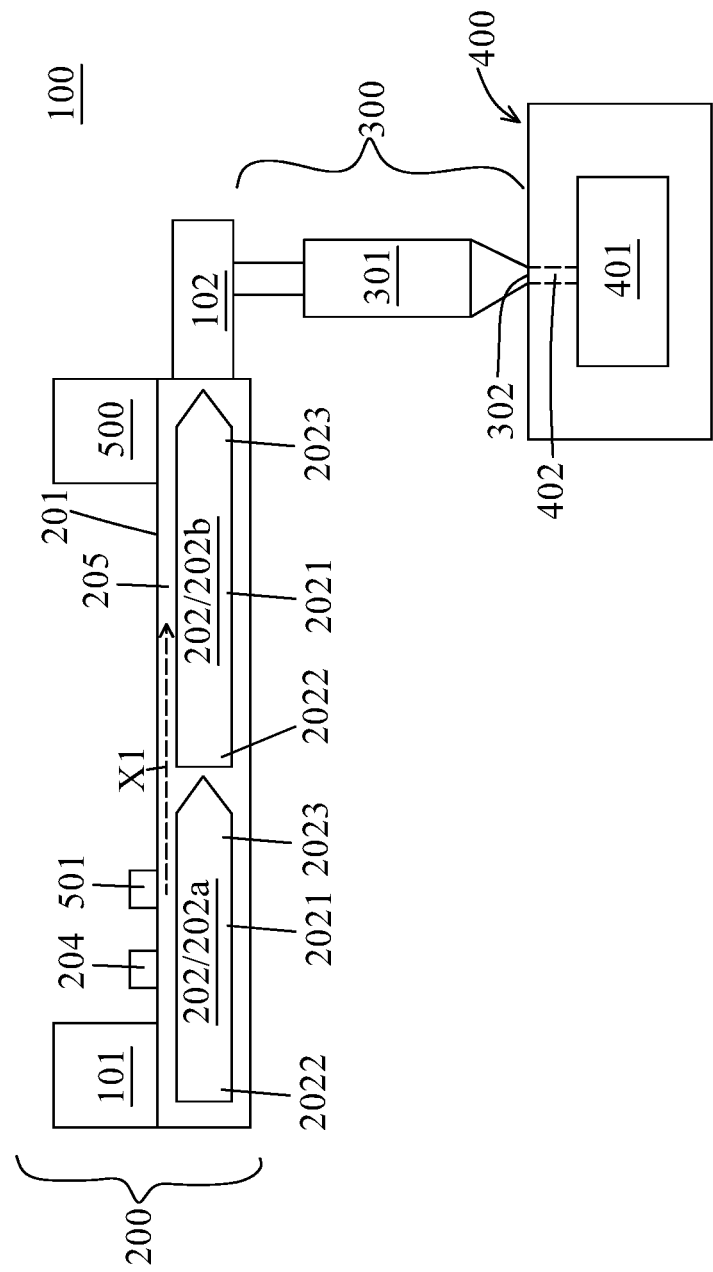
FIG. 1 is a cross-sectional view of an extruding system according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the term "about." Accordingly, unless indicated to the contrary, the numerical parameters set forth in the present disclosure and the attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

The injection molding system 100 can be in various configurations as shown in any of FIGS. 1 to 15. FIGS. 1, 2, 4, 7, 11 and 14 illustrate schematic cross-sectional views of various injection molding systems 100. FIG. 3 illustrates a schematic cross-sectional view of a mixing cartridge 201, a first mixing screw 202a and a second mixing screw 202b in FIG. 2. FIG. 5 illustrates schematic cross-sectional view of the mixing cartridge 201, the first mixing screw 202a, the second mixing screw 202b and a third mixing screw 202c in FIG. 4. FIG. 6 illustrates a schematic cross-sectional view of the mixing unit 200 in another arrangement. FIGS. 8-10, 12-13 and 15 illustrate schematic perspective views of various mixing units 200.

Referring to FIG. 1, an extruding system 100 for mixing a polymeric material and a blowing agent provided in a preferred embodiment of the present invention includes a mixing unit 200, an injection unit 300, and a molding device 400. In some embodiments, the injection unit 300 is coupled with the mixing unit 200, and the molding device 400 is coupled with the injection unit 300.

In some embodiments, the polymeric material is conveyed into the mixing unit 200 through an inlet 101 coupled to a mixing cartridge 201. In some embodiments, the blowing agent is conveyed into the mixing unit 200 through a port 204 coupled to the mixing cartridge 201. In some embodiments, a mixture of the polymeric material and the blowing agent ultimately leaves the mixing unit 200 through an outlet 102 coupled to the mixing unit 200. After leaving the mixing unit 200, the mixture is injected into a molding cavity 401 of the molding device 400 through an injector 301 of the injection unit 300. The mixture is discharged from a nozzle 302 coupled to the injector 301, and then injected into the molding cavity 401 through a feeding passage 402 of the molding device 400.

In some embodiments, a polymeric raw material is heated to become a flowable polymeric material, and then the flowable polymeric material is conveyed into the mixing unit 200 through the inlet 101. In some embodiments, the mixing cartridge 201 is hollowed and in a cylindrical shape for holding the flowable polymeric material, the blowing agent and the mixture of the flowable polymeric material and the blowing agent. In some embodiments, the flowable polymeric material is formed by hot-melting or any other suitable processes. The technical details of hot-melting are known in the prior art, and description thereof is omitted herein.

In some embodiments, the polymeric material includes ethylene vinyl acetate (EVA), styrene-ethylene-butylene-styrene (SEBS), thermoplastic polyurethanes (TPU), thermoplastic polyester elastomer (TPEE) or the like. In some embodiments, the blowing agent can be any type of chemical or physical blowing agent known to those of ordinary skill in the art. In some embodiments, the blowing agent is a supercritical fluid. The supercritical fluid may include inert gas such as carbon dioxide or nitrogen in supercritical state.

The mixing unit 200 is a blending device that is capable of achieving melt-mixing in which different fluids are mixed to form the mixture, such as a homogenous mixture. In some embodiments, the mixing unit 200 includes the mixing cartridge 201 and a plurality of mixing screws 202 disposed in the mixing cartridge 201. In some embodiments, the mixing screws 202 increase the mixing time of mixing the polymeric material and the blowing agent.

In some embodiments, the polymeric material is forced and pushed into the mixing cartridge 201 through the inlet 101 by a pushing force, while the blowing agent is also conveyed into the mixing cartridge 201 through the port 204, such that the polymeric material and the blowing agent are agitated and mixed to form a homogenous single-phase mixture in the mixing cartridge 201 by rotation of the mixing screws 202. The homogenous single-phase mixture can then flow out from the mixing unit 200 through the outlet 102 into the injection unit 300.

The plurality of the mixing screws 202 may be arranged along a first direction X1 in the mixing cartridge 201. In some embodiments, the polymeric material is mixed with the blowing agent in a space between the mixing cartridge 201 and the corresponding mixing screw 202. In some embodiments, the mixing unit 200 includes a first mixing screw 202a and a second mixing screw 202b disposed in the mixing cartridge 201.

In some embodiments, after the polymeric material is conveyed into the mixing cartridge 201 through the inlet 101 and the blowing agent is conveyed into the mixing cartridge 201 through the port 204, the polymeric material and the blowing agent are conveyed along the mixing cartridge 201 and mixed with the blowing agent in the mixing cartridge 201 and agitated by rotation of the first mixing screw 202a and the second mixing screw 202b sequentially. In some embodiments, the polymeric material, the blowing agent and the mixture thus obtained are conveyed along the first direction X1 and are in contact with the first mixing screw 202a and the second mixing screw 202b sequentially.

In some embodiments, an end of the mixing cartridge 201 is connected to the inlet 101, and an opposite end of the mixing cartridge 201 is connected to the outlet 102. In some embodiments, the mixing unit 200 is communicable with the inlet 101 and the outlet 102. In some embodiments, the polymeric material can flow from a hot-melting unit (not shown) into the mixing cartridge 201 through the inlet 101. In some embodiments, the blowing agent can flow from a blowing agent supply unit (not shown) into the mixing cartridge 201 through the port 204.

In some embodiments, the polymeric material is supplied into the mixing cartridge 201 through several inlets 101. In some embodiments, the number of the inlets 101 is not limited and is adjustable depending on various factors (e.g., type of the polymeric material, total length of the mixing screws 202, pressure inside the mixing cartridge 201, etc.) to achieve a desired mixing of the polymeric material with the blowing agent. In some embodiments, a position of each of the inlets 101 is adjustable depending on various factors (e.g., flow rate of the polymeric material along the mixing cartridge 201, pressure inside the mixing cartridge 201, etc.) to achieve a desired mixing of the polymeric material with the blowing agent.

In some embodiments, the blowing agent is supplied into the mixing cartridge 201 through several ports 204. The number of the ports 204 is not limited and is adjustable depending on various factors (e.g., type of the polymeric material, total length of the mixing screws 202, pressure inside the mixing cartridge 201, etc.) to achieve a desired mixing of the polymeric material with the blowing agent. In some embodiments, a position of each of the ports 204 is adjustable depending on various factors (e.g., flow rate of the polymeric material along the mixing cartridge 201, pressure inside the mixing cartridge 201, etc.) to achieve a desired mixing of the polymeric material with the blowing agent.

In some embodiments, the mixing cartridge 201 of the mixing unit 200 includes a plurality of the mixing screws 202. The plurality of the mixing screws 202 may be arranged along the first direction X1 in the mixing cartridge 201. In some embodiments, a first mixing screw 202a is disposed adjacent to the inlet 101, and a second mixing screw 202b is disposed adjacent to the outlet 102. In some embodiments, the first mixing screw 202a is disposed above the second mixing screw 202b. In some embodiments, the first mixing screw 202a and the second mixing screw 202b are horizontally aligned with each other. The first mixing screw 202a and the second mixing screw 202b are disposed within and extend along the mixing cartridge 201. In some embodiments, each of the first mixing screw 202a and the second mixing screw 202b is rotatable relative to the mixing cartridge 201. In some embodiments, each of the first mixing screw 202a and the second mixing screw 202b is rotatably disposed in the mixing cartridge 201, and located between the inlet 101 and the outlet 102. In some embodiments, the first mixing screw 202a and the second mixing screw 202b are rotatable about their central axes respectively. In some embodiments, their central axes are common and are in parallel to the first direction X1. Even though FIG. 1 only has two mixing screws 202, but can be more, and all are linearly and horizontally arranged one by one along the first direction XL.

In some embodiments, each of the mixing screws 202 has a length to diameter (L:D) ratio greater than 24:1, preferably greater than or equal to 25:1, more preferably greater than or equal to 50:1, and most preferably greater than or equal to 75:1. The length of each of the first mixing screw 202a and the second mixing screw 202b extends along the first direction X1, wherein the polymeric material and the blowing agent are conveyed between the inlet 101 and the outlet 102 along the first direction XL. In some embodiments, the L:D ratio of the first mixing screw 202a and the L:D ratio of the second mixing screw 202b are same as, similar to or different from each other.

In order to enable uniform mixing of the polymeric material and the blowing agent in the mixing cartridge 201, each of the mixing screws 202 includes a column-like body 2021 in the shape of a straight cylinder, rotatably disposed in the mixing cartridge 201. Each of the mixing screws 202 further includes a first groove portion 2022 annularly arranged on the periphery of the column-like body 2021 at one end adjacent to the inlet 101. A second groove portion 2023 is annularly arranged on the periphery of the column-like body 2021 at the other end adjacent to the outlet 102. Therefore, when the column-like body 2021 rotates, the polymeric material and the blowing agent are agitated by the first groove portion 2022 and the second groove portion 2023, so as to achieve a desired mixing effect. In some embodiments, the first groove portion 2022 and the second groove portion 2023 may have a plurality of grooves of different curvatures, respectively, such that a better mixing effect of the polymeric material and the blowing agent is achieved in the mixing cartridge 201.

In some embodiments, the injection unit 300 is communicable with the mixing unit 200 through the outlet 102. The polymeric material mixed with the blowing agent can be conveyed from the mixing cartridge 201 into the injection unit 300 through the outlet 102. In some embodiments, the outlet 102 is disposed between the mixing cartridge 201 and the injection unit 300, such that the mixing cartridge 201 can communicate with the injection unit 300.

In some embodiments, the extruding system 100 further comprises a monitoring module 500 configured to monitor the extruding system 100 in real time. In some embodiments, the monitoring module 500 includes a sensor 501 disposed in the extruding system 100. In some embodiments, the monitoring module 500 includes a plurality of sensors 501 disposed throughout the extruding system 100 according to the actual needs. In some embodiments, the sensors 501 are configured to sense at least one processing condition (e.g., a flow rate or viscosity of the polymeric material along the inlet 101 and the mixing unit 200, an amount of the mixture accumulated in the injection unit 300, the pressure inside the mixing cartridge 201, temperatures at each unit, rotational speeds of the mixing screws 202, or flow rate and amount of the blowing agent flowing through the port 204) at a predetermined position of the extruding system 100, and transmit a signal or data, based on the detected processing condition, to the monitoring module 500 for further analysis. In some embodiments, the monitoring module 500 can automatically monitor and instantly adjust the processing conditions at the corresponding positions of the extruding system 100 in accordance with the processing conditions sensed by the sensors 501, in such a manner that the mixture thus obtained has the desired predetermined property.

Figure 2:
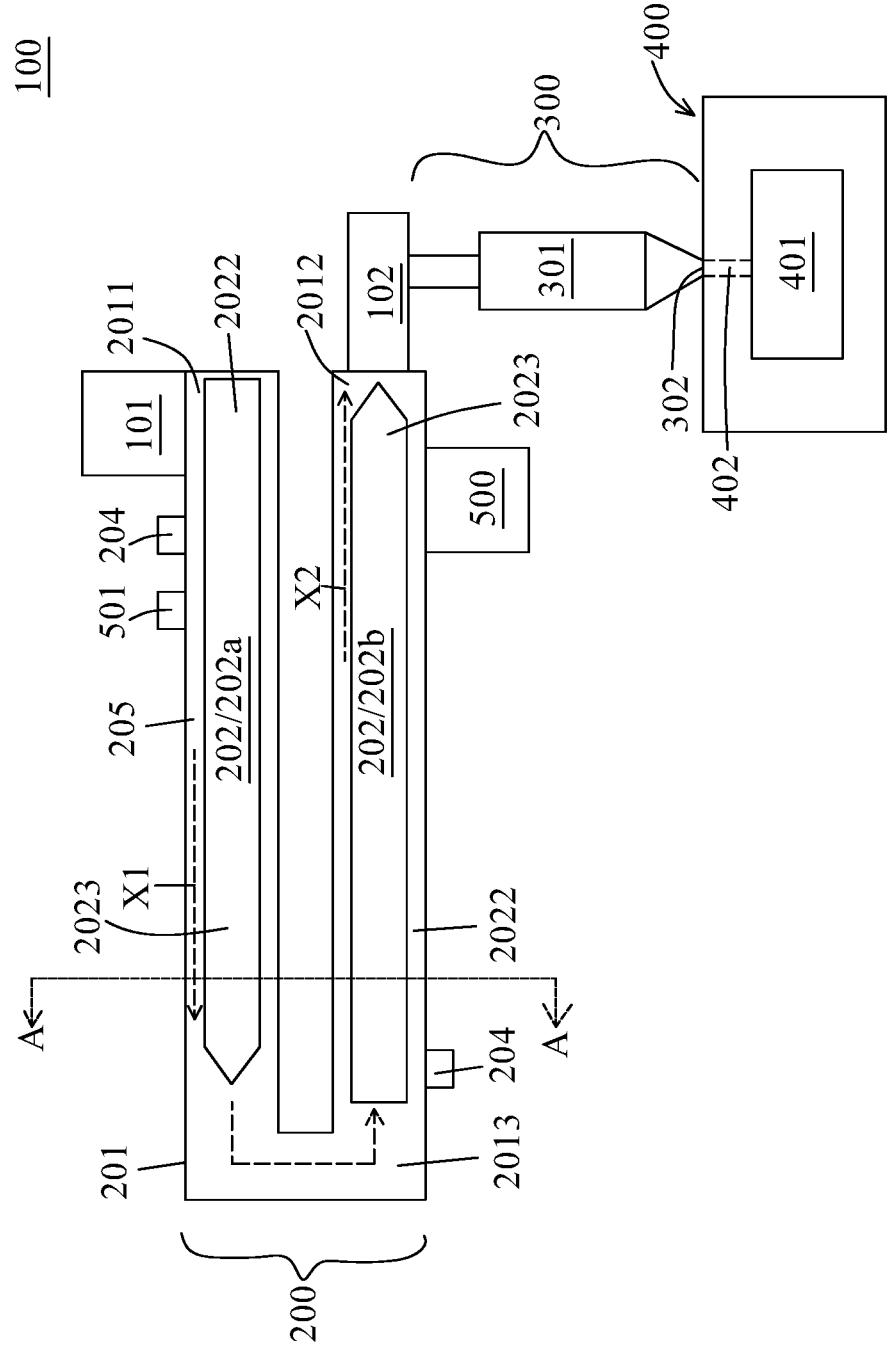
FIG. 2 is a cross-sectional view of an extruding system according to one embodiment of the present invention.
Figure 3:
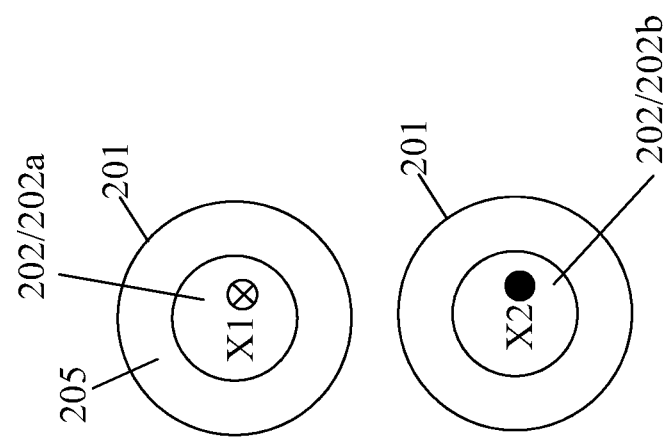
FIG. 3 is a cross-sectional view taken along the section line A-A in FIG. 2.

Referring to FIG. 2, in some embodiments, the mixing cartridge 201 of the mixing unit 200 is arranged in a U shape. In some embodiments, the mixing cartridge 201 includes a first end 2011 and a second end 2012 disposed at the two ends of the U-shaped mixing cartridge 201, and a middle end 2013 disposed between the first end 2011 and the second end 2012. In some embodiments, the first end 2011 and the second end 2012 are disposed at the same side of the mixing cartridge 201, and the middle end 2013 is disposed opposite to the first end 2011 and the second end 2012.

In some embodiments, the first mixing screw 202a and the second mixing screw 202b are arranged in the U-shaped mixing cartridge 201. In some embodiments, the first groove portion 2022 of the first mixing screw 202a is adjacent to the inlet 101, and the second groove portion 2023 of the first mixing screw 202a is located at the middle end 2013 of the mixing cartridge 201. In some embodiments, the first groove portion 2022 of the second mixing screw 202b is located at the middle end 2013 of the mixing cartridge 201, and the second groove portion 2023 of the second mixing screw 202b is adjacent to the outlet 102.

In some embodiments, the first mixing screw 202a and the second mixing screw 202b are substantially parallel to each other. In some embodiments, the first mixing screw 202a extends along the first direction X1 and the second mixing screw 202b extends along a second direction X2 different from the first direction. In some embodiments, the first direction X1 is different from the second direction X2. In some embodiments, the first direction X1 is orthogonal to the second direction X2. In some embodiments, the first direction X1 is opposite to the second direction X2. In some embodiments, the polymeric material is in contact with the first mixing screw 202a and the second mixing screw 202b sequentially. In some embodiments, the first mixing screw 202a is vertically aligned with the second mixing screw 202b.

In some embodiments, after the polymeric material is received from the inlet 101 and the blowing agent is received from the port 204, the polymeric material and the blowing agent are conveyed into the mixing cartridge 201 and are agitated by rotation of the first mixing screw 202a and the second mixing screw 202b sequentially, and ultimately flow out of the mixing unit 200 through the outlet 102. In some embodiments, the polymeric material, the blowing agent and the mixture thus obtained are conveyed along the first direction X1 when agitated by rotation of the first mixing screw 202a, and are conveyed along the second direction X2 when agitated by rotation of the second mixing screw 202b.

Figure 4:
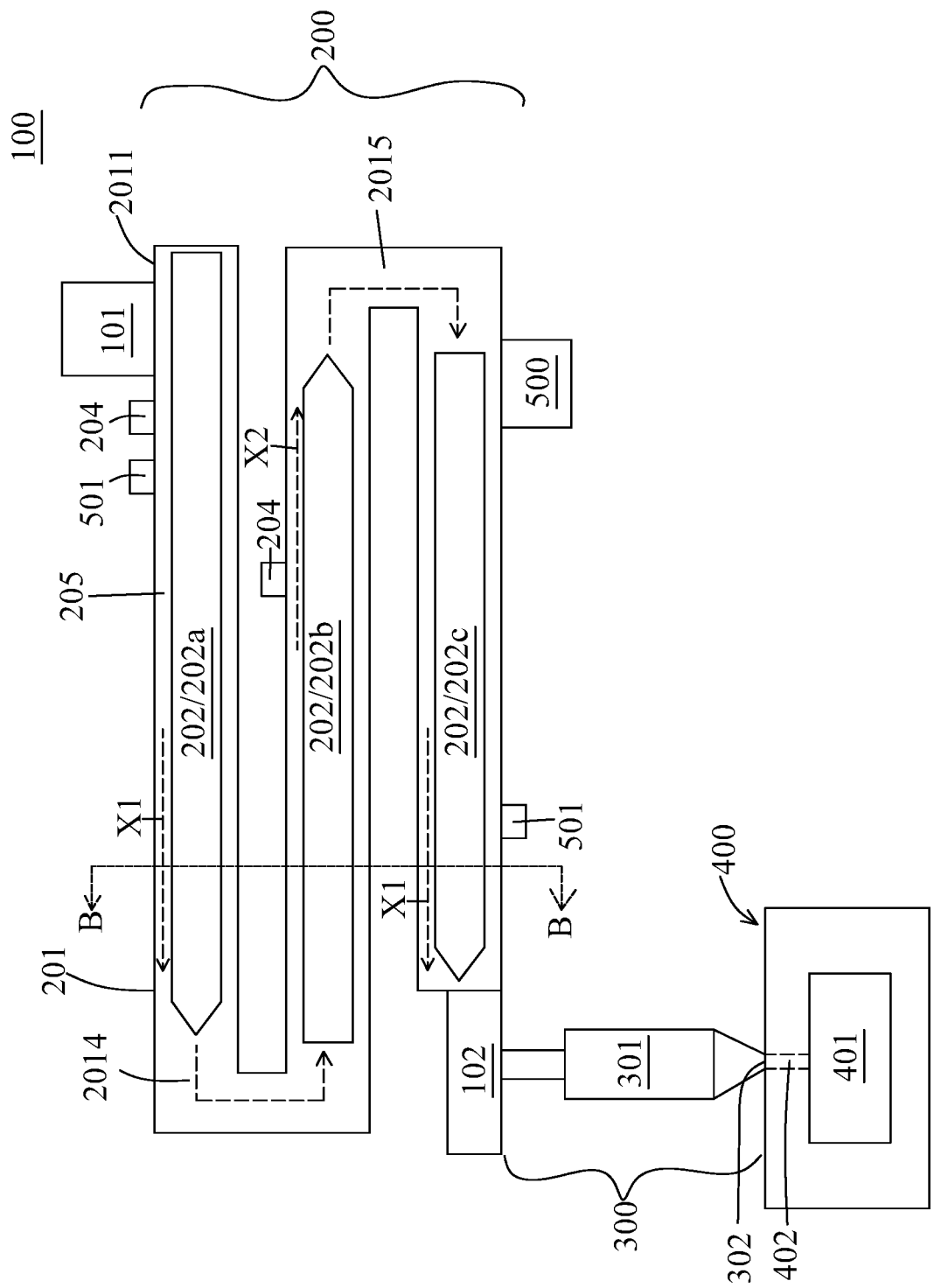
FIG. 4 is a cross-sectional view of an extruding system according to one embodiment of the present invention.
Figure 5:
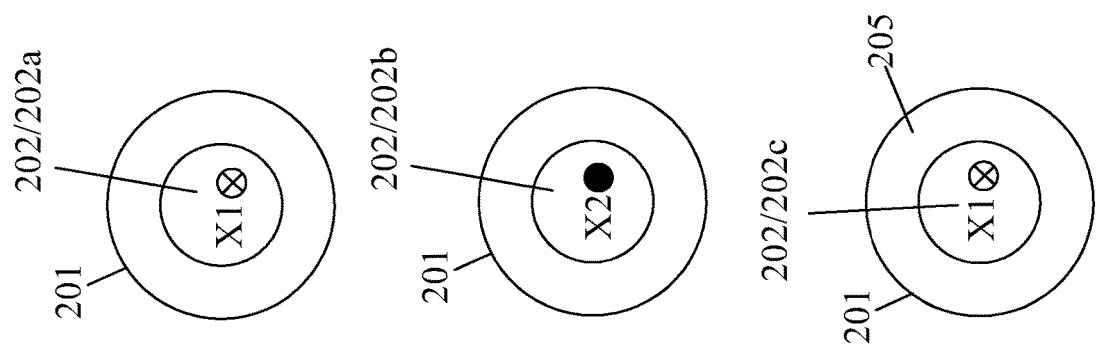
FIG. 5 is a cross-sectional view taken along the section line B-B in FIG. 4.
Figure 6:
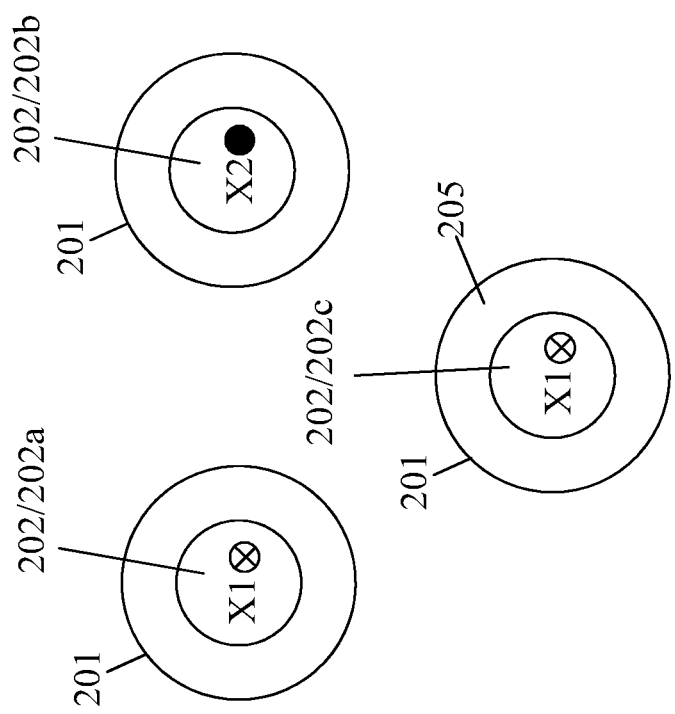
FIG. 6 is another embodiment of a cross-sectional view taken along the section line B-B in FIG. 4.

Referring to FIGS. 4 and 5, in some embodiments, the mixing cartridge 201 of the mixing unit 200 is arranged in an S shape. In some embodiments as shown in FIG. 4, the mixing cartridge 201 includes a first end 2011 adjacent to the inlet 101, a second end 2012 opposite to the first end 2011 and adjacent to the outlet 102, a first middle end 2014 between the first end 2011 and the second end 2012, and a second middle end 2015 between the first middle end 2014 and the second end 2012. In some embodiments, the first end 2011 and the second middle end 2015 are disposed at the same side of the mixing cartridge 201, and the first middle end 2014 and the second end 2012 are disposed opposite to the first end 2011 and the second middle end 2015.

In some embodiments, a plurality of the mixing screws 202 are disposed in the mixing cartridge 201, such as a first mixing screw 202a, a second mixing screw 202b, and a third mixing screw 202c. In some embodiments, the first mixing screw 202a is disposed between the first end 2011 and the first middle end 2014 of the mixing cartridge 201. In some embodiments, the second mixing screw 202b is disposed between the first middle end 2014 and the second middle end 2015 of the mixing cartridge 201. In some embodiments, the third mixing screw 202c is disposed between the second middle end 2015 and the second end 2012 of the mixing cartridge 201. Each of the first, second and third mixing screws 202a, 202b, 202c may be arranged along the first direction X1 or second direction X2. In some embodiments, the first mixing screw 202a, the second mixing screw 202b and the third mixing screw 202c are substantially parallel to each other. In some embodiments, the second mixing screw 202b is vertically aligned with the first mixing screw 202a and the third mixing screw 202c.

In some embodiments, after the polymeric material is received from the inlet 101 and the blowing agent is received from the port 204, the polymeric material and the blowing agent are conveyed into the mixing cartridge 201 and agitated by rotation of the first mixing screw 202a, the second mixing screw 202b, and the third mixing screw 202c, sequentially, and ultimately flow out of the mixing unit 200 through the outlet 102. In some embodiments, the polymeric material, the blowing agent and the mixture thus obtained flow along the first direction X1 while being agitated by rotation of the first mixing screw 202a and the third mixing screw 202c, and flow along the second direction X2 while being agitated by rotation of the second mixing screw 202b.

In some embodiments, the first mixing screw 202a, the second mixing screw 202b, and the third mixing screw 202c are disposed adjacent to and parallel to each other. In some embodiments, the first mixing screw 202a is disposed above the second mixing screw 202b and the third mixing screw 202c. In some embodiments, the second mixing screw 202b is disposed between the first mixing screw 202a and the third mixing screw 202c.

In some embodiments, the arrangement of the first mixing screw 202a, the second mixing screw 202b and the third mixing screw 202c inside the mixing cartridge 201 is not limited. For example, as shown in FIG. 6, the first mixing screw 202a, the second mixing screw 202b, and the third mixing screw 202c are arranged in a polar array. In some embodiments, the first mixing screw 202a and the second mixing screw 202b are horizontally aligned. In some embodiments, the third mixing screw 202c is disposed under the first mixing screw 202a and the second mixing screw 202b.

In some embodiments, as shown in FIGS. 7 to 15, the mixing cartridge 201 includes several mixing chambers 205. In some embodiments, several mixing screws 202 are respectively disposed inside the mixing chambers 205, and several connecting passages 203 connect the adjacent mixing chambers 205 of the mixing cartridge 201. In some embodiments, the mixing chambers 205 have configurations that are same as, similar to, or different from each other. In some embodiments, the mixing screws 202 have configurations that are same as, similar to, or different from each other. In some embodiments, the connecting passages 203 have configurations that are same as, similar to, or different from each other. In some embodiments, several sensors 501 are placed at one or more of the mixing chambers 205 and/or one or more of the connecting passages 203.

The number of the mixing chambers 205 is not limited and is adjustable depending on various factors (e.g., flow rates of the polymeric material along the mixing chambers 205, pressure inside the mixing cartridge 201, etc.) to achieve a desired mixing of the polymeric material with the blowing agent. In some embodiments, more mixing chambers 205 are desirable because duration of the mixing of the polymeric material with the blowing agent is increased. The polymeric material can be mixed thoroughly before being discharged from the outlet 102.

Figure 7:
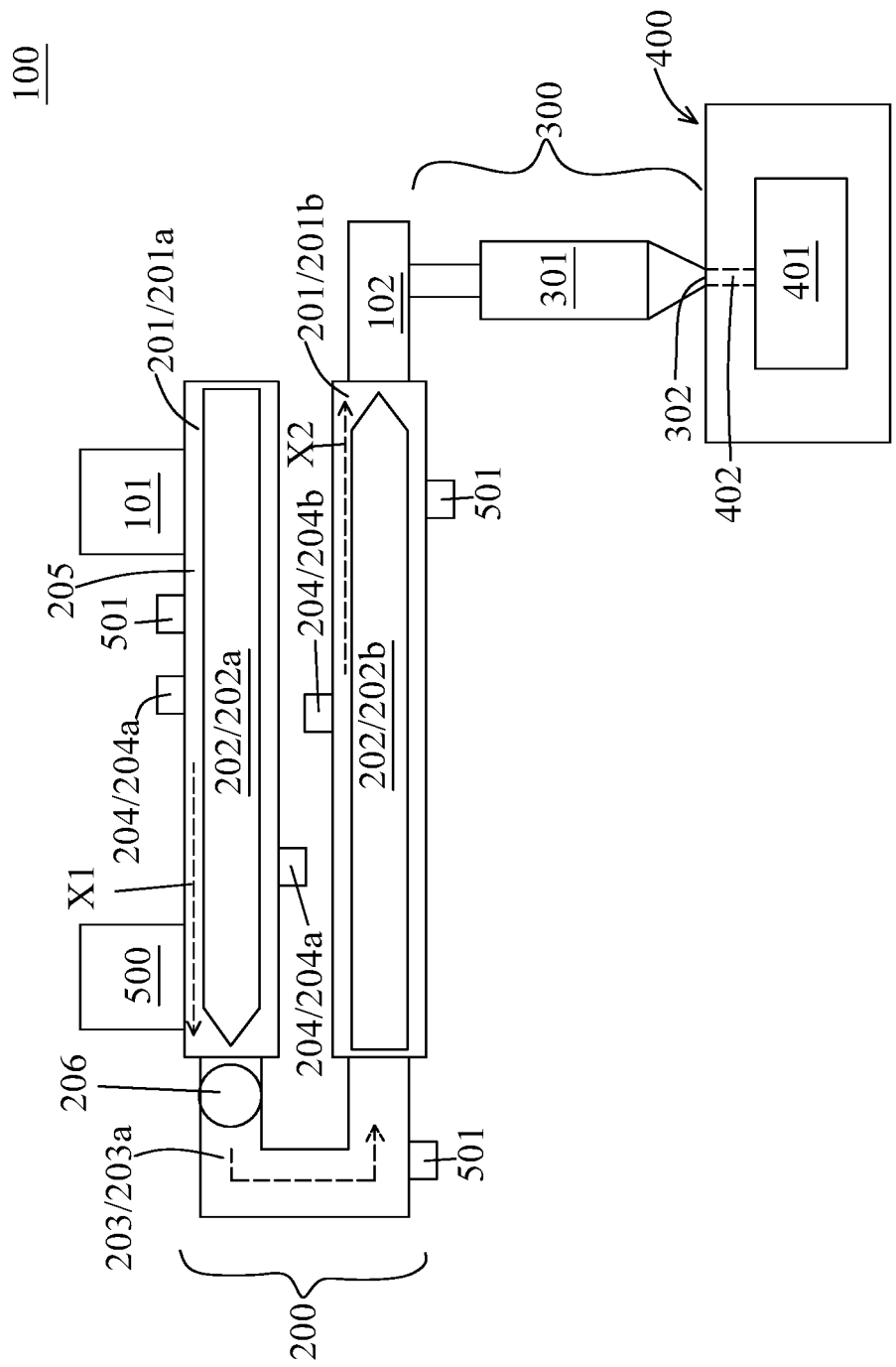
FIG. 7 is a cross-sectional view of an extruding system according to one embodiment of the present invention.
Figure 8:
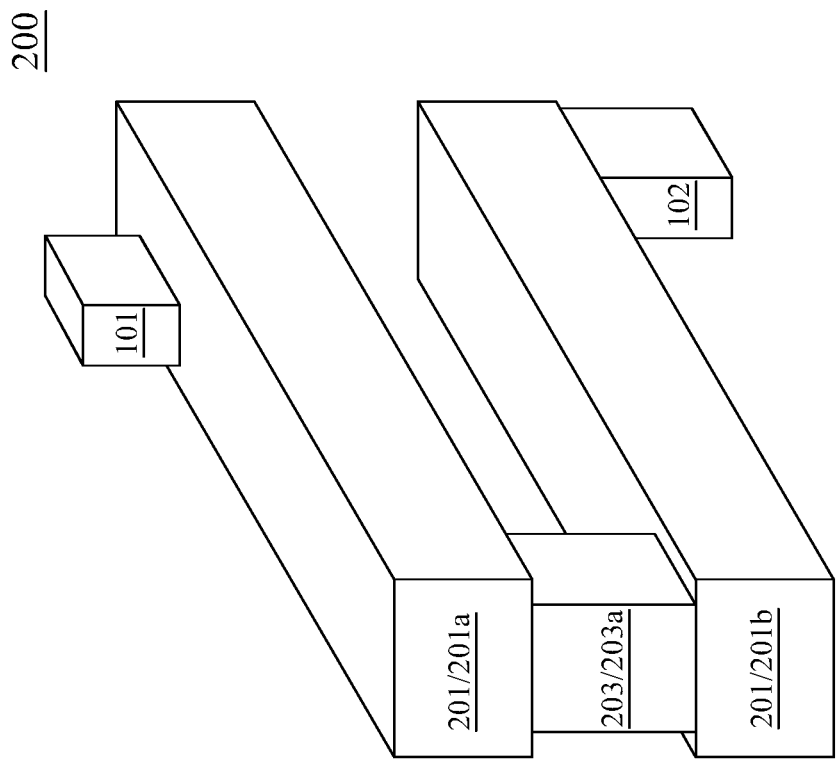
FIGS. 8 to 10 are perspective views of a mixing unit according to one embodiment of the present invention.

In some embodiments, as shown in FIGS. 7 and 8, the mixing cartridge 201 includes a first mixing chamber 201a and a second mixing chamber 201b coupled with the first mixing chamber 201a, and the first and second mixing screws 202a, 202b are disposed in the first and second mixing chambers 201a, 201b, respectively. In some embodiments, the polymeric material enters the first mixing chamber 201a through the inlet 101, and the mixture leaves the second mixing chamber 201b through the outlet 102.

In some embodiments, the first mixing screw 202a and the second mixing screw 202b are rotatable relative to the first mixing chamber 201a and the second mixing chamber 201b respectively. In some embodiments, the first mixing screw 202a is not laterally movable relative to the first mixing chamber 201a during the rotation of the first mixing screw 202a. In some embodiments, the second mixing screw 202b is not laterally movable relative to the second mixing chamber 201b during the rotation of the second mixing screw 202b.

In some embodiments, a first passage 203a bridges the first mixing chamber 201a and the second mixing chamber 201b. In some embodiments, the first mixing chamber 201a is communicable with the second mixing chamber 201b via the first passage 203a.

In some embodiments, the polymeric material is conveyed along the first mixing chamber 201a and the second mixing chamber 201b by the rotation of the first mixing screw 202a and the second mixing screw 202b sequentially. In some embodiments, the first mixing chamber 201a is coupled with the second mixing chamber 201b by the first passage 203a. The polymeric material can flow along the first mixing chamber 201a, the first passage 203a and the second mixing chamber 201b. In some embodiments, the polymeric material flows along the first direction X1 inside the first mixing chamber 201a and along the second direction X2 inside the second mixing chamber 201b. In some embodiments, the polymeric material is conveyed along the first mixing chamber 201a and the second mixing chamber 201b sequentially.

In some embodiments, the mixture is conveyed along the first mixing chamber 201a and the second mixing chamber 201b, sequentially. In some embodiments, during the conveying of the mixture along the first mixing chamber 201a and the second mixing chamber 201b, the polymeric material is mixed with the blowing agent. In some embodiments, the polymeric material is mixed with the blowing agent in the space between the first mixing chamber 201a and the second mixing chamber 201b and the corresponding mixing screws 202.

In some embodiments, the first mixing chamber 201a is disposed over the second mixing chamber 201b. In some embodiments, the first mixing chamber 201a is vertically aligned with the second mixing chamber 201b. In some embodiments, the polymeric material is flowable downwardly from the inlet 101 to the outlet 102 along the first mixing chamber 201a, the first passage 203a and the second mixing chamber 201b.

In some embodiments, the mixing unit 200 further includes a first port 204a coupled to the first mixing chamber 201a, wherein the first port 204a is configured to provide the blowing agent into the first mixing chamber 201a, and a second port 204b coupled to the second mixing chamber 201b, wherein the second port 204b is configured to provide the blowing agent into the second mixing chamber 201b.

In some embodiments, during the conveying of the polymeric material along the first mixing chamber 201a, the blowing agent is supplied into the first mixing chamber 201a through the first ports 204a. In some embodiments, during the conveying of the polymeric material and/or the mixture along the second mixing chamber 201b, the blowing agent is supplied into the second mixing chamber 201b through the second ports 204b. It can be understood that any suitable number of the first ports 204a can be configured at the first mixing chamber 201a, and any suitable number of the second ports 204b can be configured at the second mixing chamber 201b. For example, two first ports 204a are configured at the first mixing chamber 201a, and one second port 204b is configured at the second mixing chamber 201b. It can also be understood that the first ports 204a can be configured at any predetermined positions of the first mixing chamber 201a, and the second ports 204b can be configured at any predetermined positions of the second mixing chamber 201b.

In some embodiments, the first and second mixing chambers 201a, 201b can have same or different temperatures. The temperature of each of the first and second mixing chambers 201a, 201b is adjustable depending on various factors (e.g., types of the polymer raw material, the mixing of the polymeric material with the blowing agent, etc.). In some embodiments, the first mixing chamber 201a has a first temperature, and the second mixing chamber 201b has a second temperature different from the first temperature.

In some embodiments, during the conveying and the mixing, the first and second mixing chambers 201a, 201b can have pressures that are same as or different from each other. In some embodiments, the first mixing chamber 201a has a first pressure, and the second mixing chamber 201b has a second pressure different from the first pressure. The pressure of each of the first and second mixing chambers 201a, 201b is adjustable depending on various factors (e.g., the mixing of the polymeric material with the blowing agent, the flow rate of the polymeric material, etc.). In some embodiments, the pressure difference between the first pressure inside the first mixing chamber 201a and the second pressure inside the second mixing chamber 201b is sensed by the sensors 501 installed in the mixing cartridge 201 and the connecting passage 203.

In some embodiments, in order to avoid undesired backflows of the polymeric material or the mixture, the mixing unit 200 further includes a flow control element 206 configured to switch between an open configuration and a closed configuration. In some embodiments, the flow control element 206 is configured to allow or prevent the mixture of the polymeric material and the blowing agent flowing between the first mixing chamber 201a and the second mixing chamber 201b. The open configuration allows the mixture of the polymeric material and the blowing agent to flow from the first mixing chamber 201a into the second mixing chamber 201b, and the closed configuration prevents the mixture of the polymeric material and the blowing agent from flowing from the second mixing chamber 201b back to the first mixing chamber 201a. In some embodiments, the flow control element 206 is configured to control a flow rate of the polymeric material or the mixture adjacent to the flow control element 206 or along the mixing cartridge 201 and the first passage 203a. In some embodiments, a first flow control element 206a is configured to maintain a pressure difference between the first mixing chamber 201a and the second mixing chamber 201b.

In some embodiments, the flow control element 206 is disposed in the connecting passage 203. In some embodiments, the flow control element 206 is a check valve. In some embodiments, the first flow control element 206a is spherical. In some embodiments, the first flow control element 206a is disposed between the first mixing chamber 201a and the second mixing chamber 201b. In some embodiments, the first flow control element 206a is disposed in the first passage 203a.

In some embodiments, only two mixing chambers 201a, 201b, two mixing screws 202a, 202b and one connecting passage 203 are illustrated, however, it can be understood that any suitable number of the mixing chambers 201a, 201b, the mixing screws 202a, 202b and the passages 203 can be configured. In some embodiments, the number of the mixing chambers 201a, 201b can be in a range of two to six. In some embodiments, the number of the mixing cartridges 201 is greater than six. Since the mixing cartridge 201 includes several mixing chambers 201a, 201b, a continuous and efficient mixing of the polymeric material with the blowing agent can be provided. Furthermore, as the efficiency of the mixing can be increased or improved, the mixing can be implemented under a relatively lower pressure.

Figure 9:
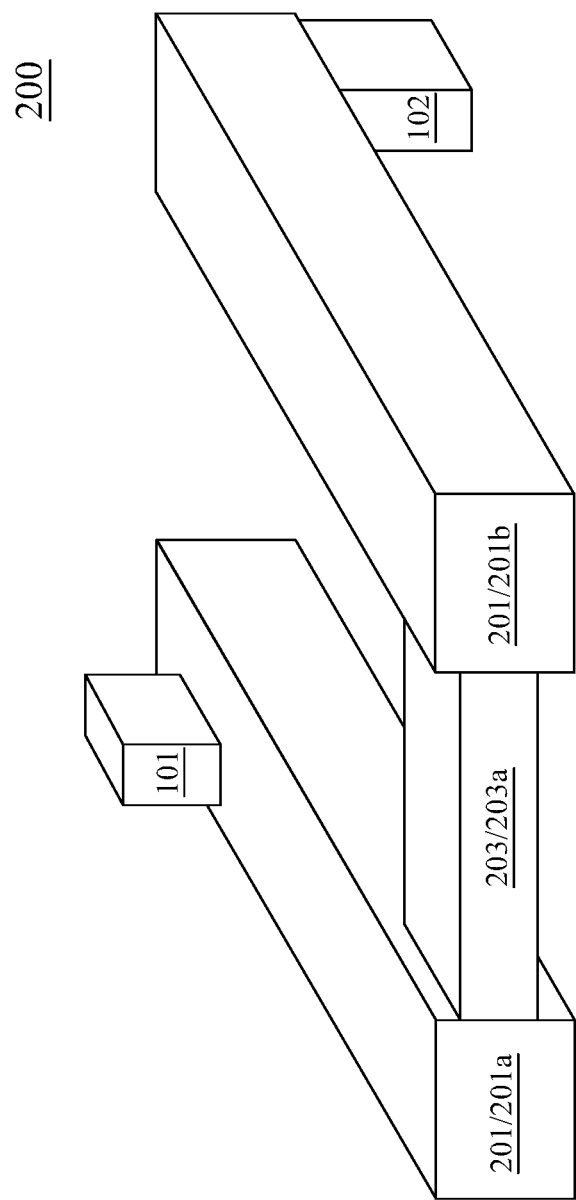

In some embodiments as shown in FIG. 9, the first mixing chamber 201a and the second mixing chamber 201b are disposed parallel to each other. In some embodiments, the first mixing chamber 201a and the second mixing chamber 201b are horizontally aligned. In some embodiments, the polymeric material is flowable horizontally from the inlet 101 to the outlet 102 along the first mixing chamber 201a, the first passage 203a and the second mixing chamber 201b.

Figure 10:
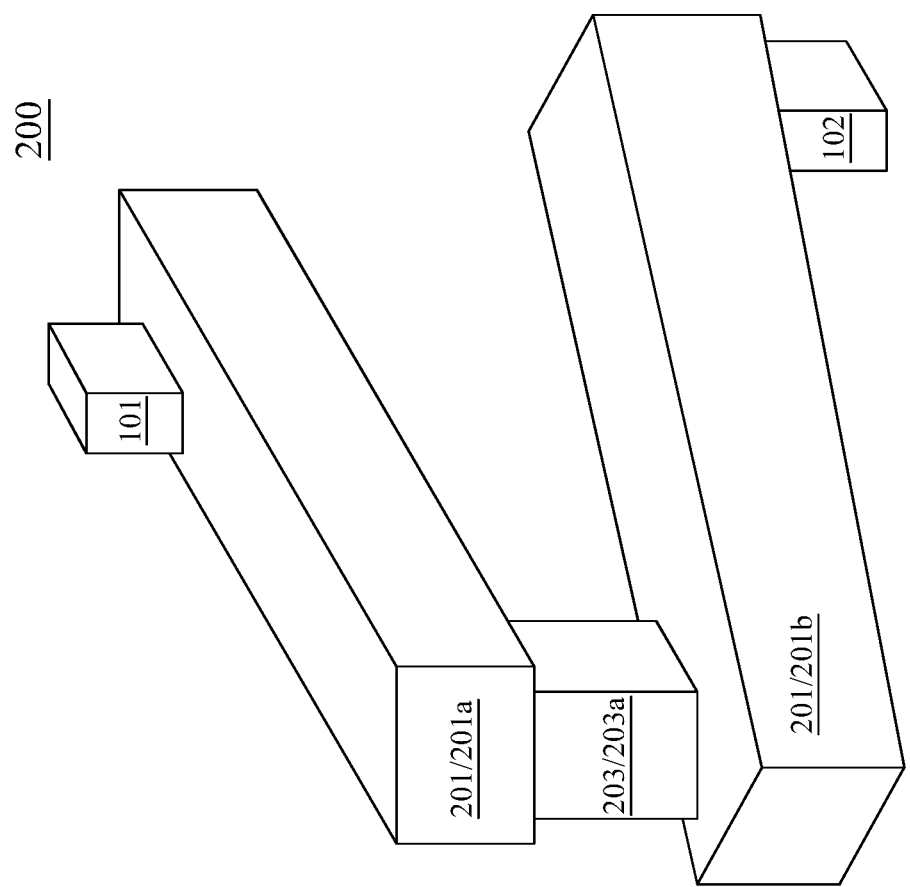

In some embodiments as shown in FIG. 10, the first mixing chamber 201a is disposed above the second mixing chamber 201b, and there is an acute angle between the first mixing chamber 201a and the second mixing chamber 201b from a top view. In some embodiments, the polymeric material, the blowing agent and the mixture thus obtained are flowable downwardly along the first mixing chamber 201a, the first passage 203a and the second mixing chamber 201b.

Figure 11:
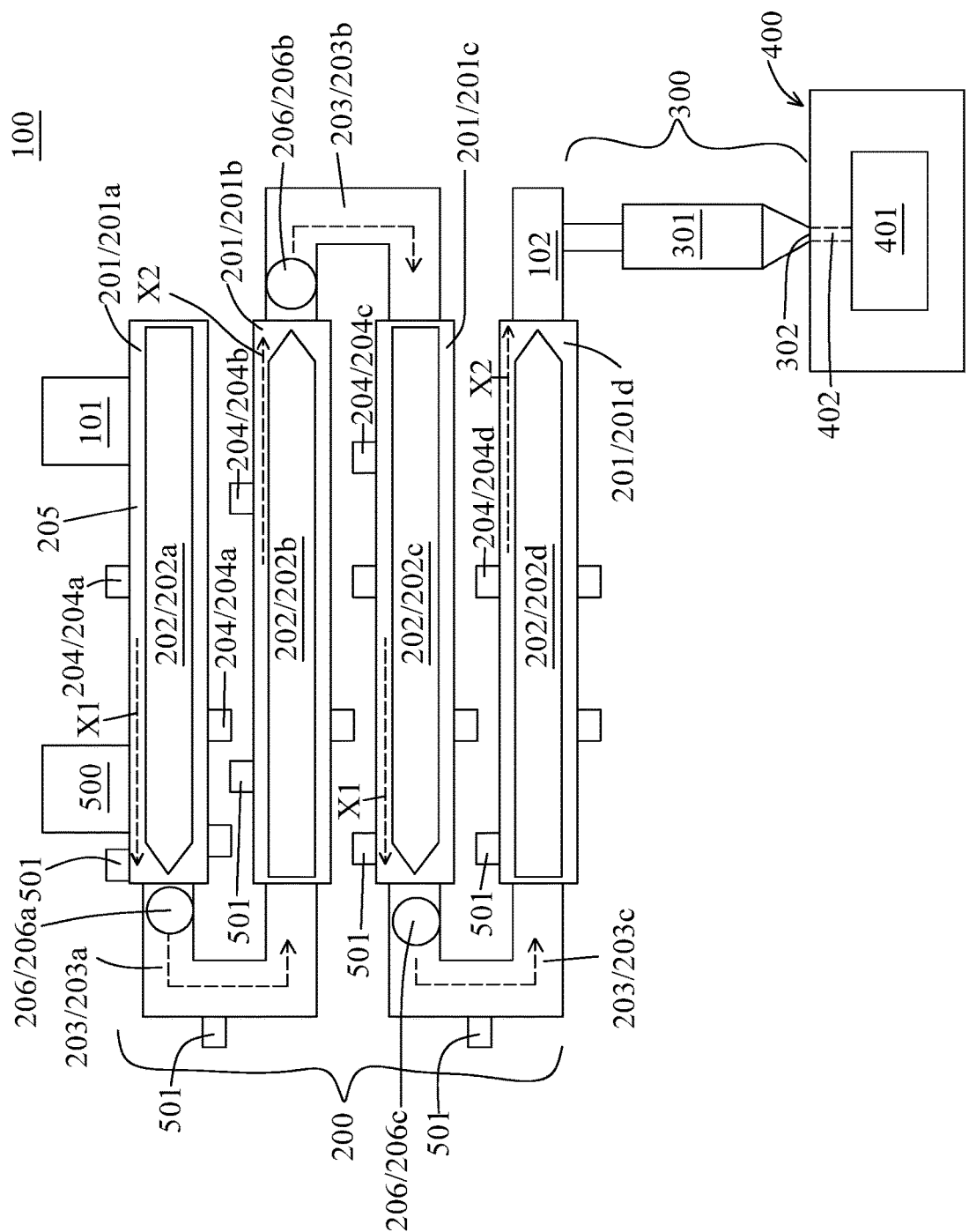
FIG. 11 is a cross-sectional view of an extruding system according to one embodiment of the present invention.
Figure 12:
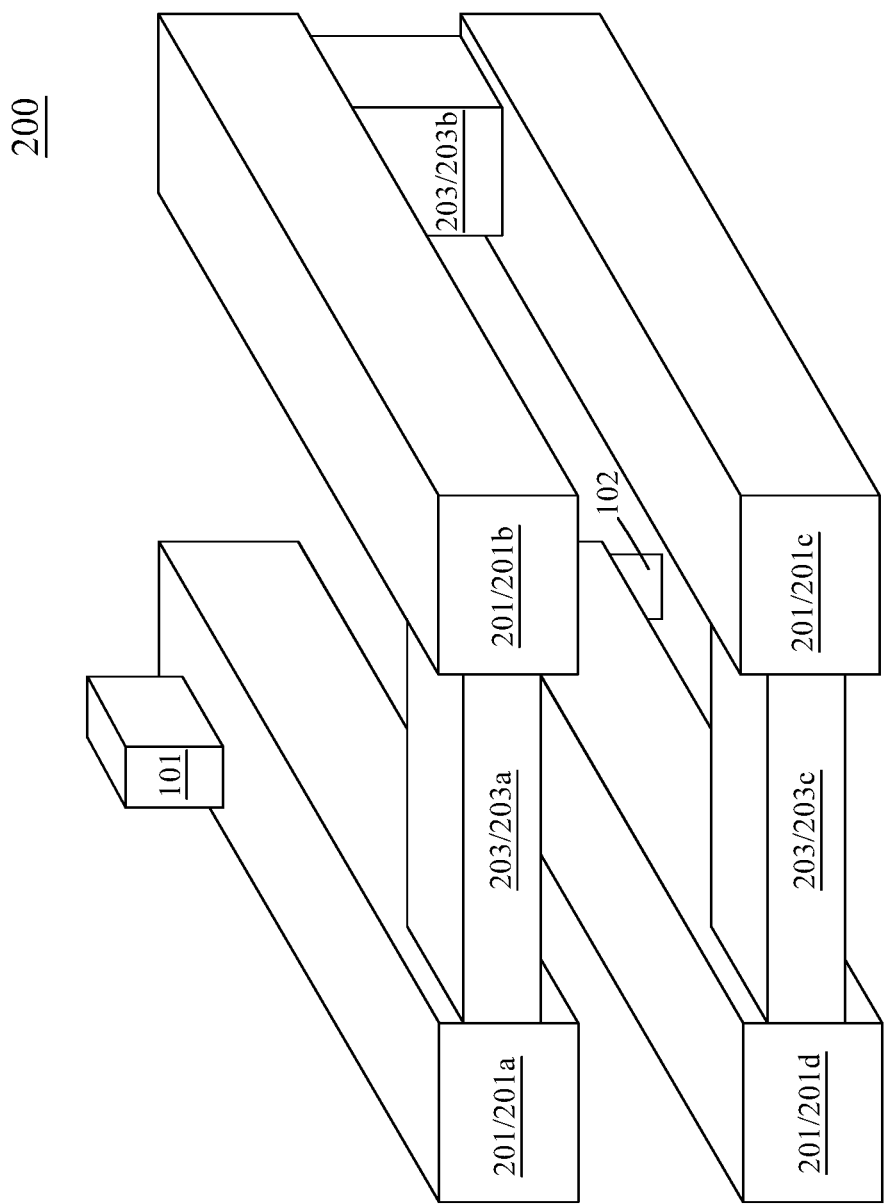
FIGS. 12 and 13 are perspective views of a mixing unit according to one embodiment of the present invention.
Figure 13:
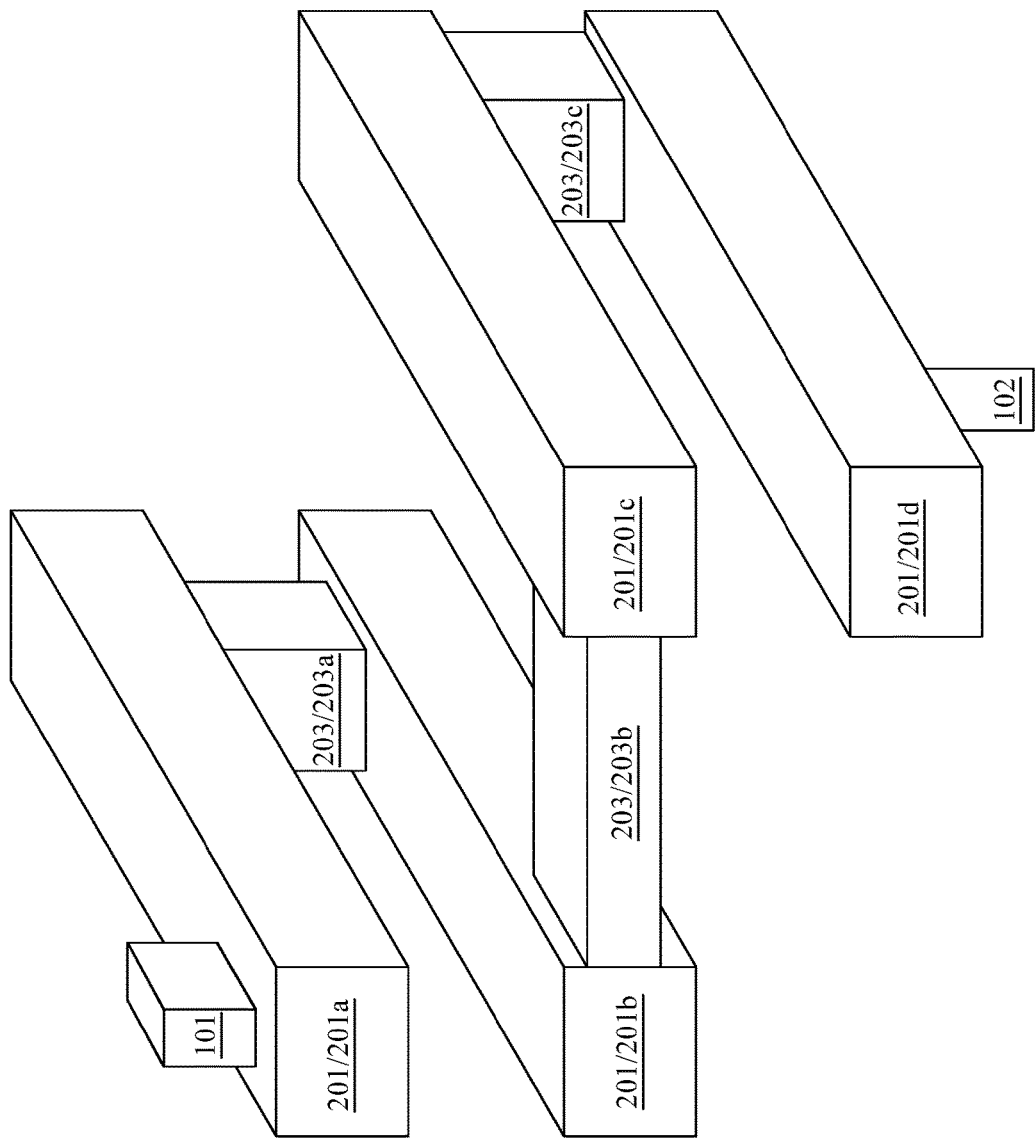

In some embodiments as shown in FIGS. 11 to 13, the mixing cartridge 201 includes four mixing chambers 201a, 201b, 201c, 201d. In some embodiments as shown in FIG. 11, the first mixing chamber 201a is disposed over the second mixing chamber 201b, the second mixing chamber 201b is disposed over the third mixing chamber 201c, and the third mixing chamber 201c is disposed over the fourth mixing chamber 201d. In some embodiments, the first mixing chamber 201a, the second mixing chamber 201b, the third mixing chamber 201c and the fourth mixing chamber 201d are vertically aligned with each other. In some embodiments, the polymeric material, the blowing agent and the mixture thus obtained are flowable downwardly along the first mixing chamber 201a, the first passage 203a, the second mixing chamber 201b, the second passage 203b, the third mixing chamber 201c, the third passage 203c and the fourth mixing chamber 201d. In some embodiments, the polymeric material, the blowing agent and the mixture thus obtained are conveyed along the first mixing chamber 201a, the second mixing chamber 201b, the third mixing chamber 201c and the fourth mixing chamber 201d sequentially.

In some embodiments, each of a third mixing screw 202c and a fourth mixing screw 202d are rotatable relative to the third mixing chamber 201c and the fourth mixing chamber 201d respectively. In some embodiments, the third mixing screw 202c is not laterally movable relative to the third mixing chamber 201c during the rotation of the third mixing screws 202c. In some embodiments, the fourth mixing screw 202d is not laterally movable relative to the fourth mixing chamber 201d during the rotation of the fourth mixing screw 202d. In some embodiments, the polymeric material flows along the first direction X1 inside the first mixing chamber 201a and the third mixing chamber 201c, and along the second direction X2 inside the second mixing chamber 201b and the fourth mixing chamber 201d.

In some embodiments, the mixing unit 200 further includes a third port 204c coupled to the third mixing chamber 201c, wherein the third port 204c is configured to provide the blowing agent into the third mixing chamber 201c, and a fourth port 204d coupled to the fourth mixing chamber 201d, wherein the fourth port 204d is configured to provide the blowing agent into the fourth mixing chamber 201d.

In some embodiments, the first to fourth mixing chambers 201a, 201b, 201c, 201d can have same or different temperatures. The temperature of each of the first to fourth mixing chambers 201a, 201b, 201c, 201d is adjustable depending on various factors (e.g., types of the polymer raw material, the mixing of the polymeric material with the blowing agent, etc.). In some embodiments, during the conveying and the mixing, the first to fourth mixing chambers 201a, 201b, 201c, 201d can have pressures that are same as or different from each other.

In some embodiments, a second flow control element 206b is disposed between the second mixing chamber 201b and the third mixing chamber 201c. In some embodiments, the second flow control element 206b is disposed in the second passage 203b. In some embodiments, a third flow control element 206c is disposed between the third mixing chamber 201c and the fourth mixing chamber 201d. In some embodiments, the third flow control element 206c is disposed in the third passage 203c.

In some embodiments as shown in FIG. 12, the first mixing chamber 201a and the second mixing chamber 201b are disposed parallel to each other, and the third mixing chamber 201c and the fourth mixing chamber 201d are disposed parallel to each other. In some embodiments, the first mixing chamber 201a and the fourth mixing chamber 201d are horizontally aligned. In some embodiments, the second mixing chamber 201b and the third mixing chamber 201c are horizontally aligned. In some embodiments, the first mixing chamber 201a is disposed over the fourth mixing chamber 201d, and the second mixing chamber 201b is disposed over the third mixing chamber 201c. In some embodiments, the polymeric material, the blowing agent and the mixture thus obtained are flowable horizontally and/or downwardly along the first mixing chamber 201a, the first passage 203a, the second mixing chamber 201b, the second passage 203b, the third mixing chamber 201c, the third passage 203c and the fourth mixing chamber 201d.

In some embodiments as shown in FIG. 13, the first mixing chamber 201a is disposed over the second mixing chamber 201b, the third mixing chamber 201c is disposed over the fourth mixing chamber 201d, and the second mixing chamber 201b and the third mixing chamber 201c are disposed parallel to each other. In some embodiments, the polymeric material, the blowing agent and the mixture thus obtained are flowable horizontally and/or downwardly along the first mixing chamber 201a, the first passage 203a, the second mixing chamber 201b, the second passage 203b, the third mixing chamber 201c, the third passage 203c and the fourth mixing chamber 201d.

Figure 14:
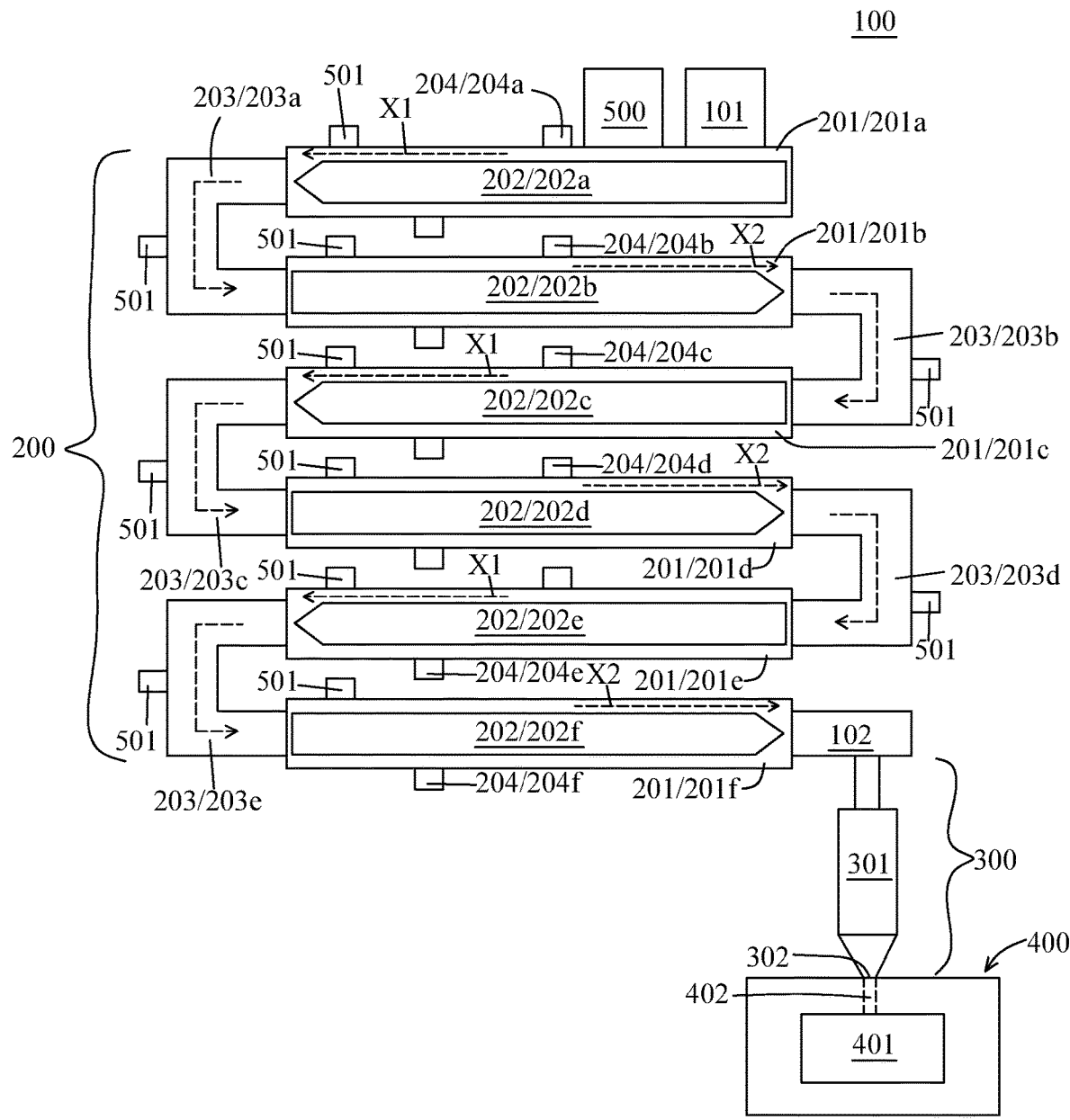
FIG. 14 is a cross-sectional view of an extruding system according to one embodiment of the present invention.
Figure 15:
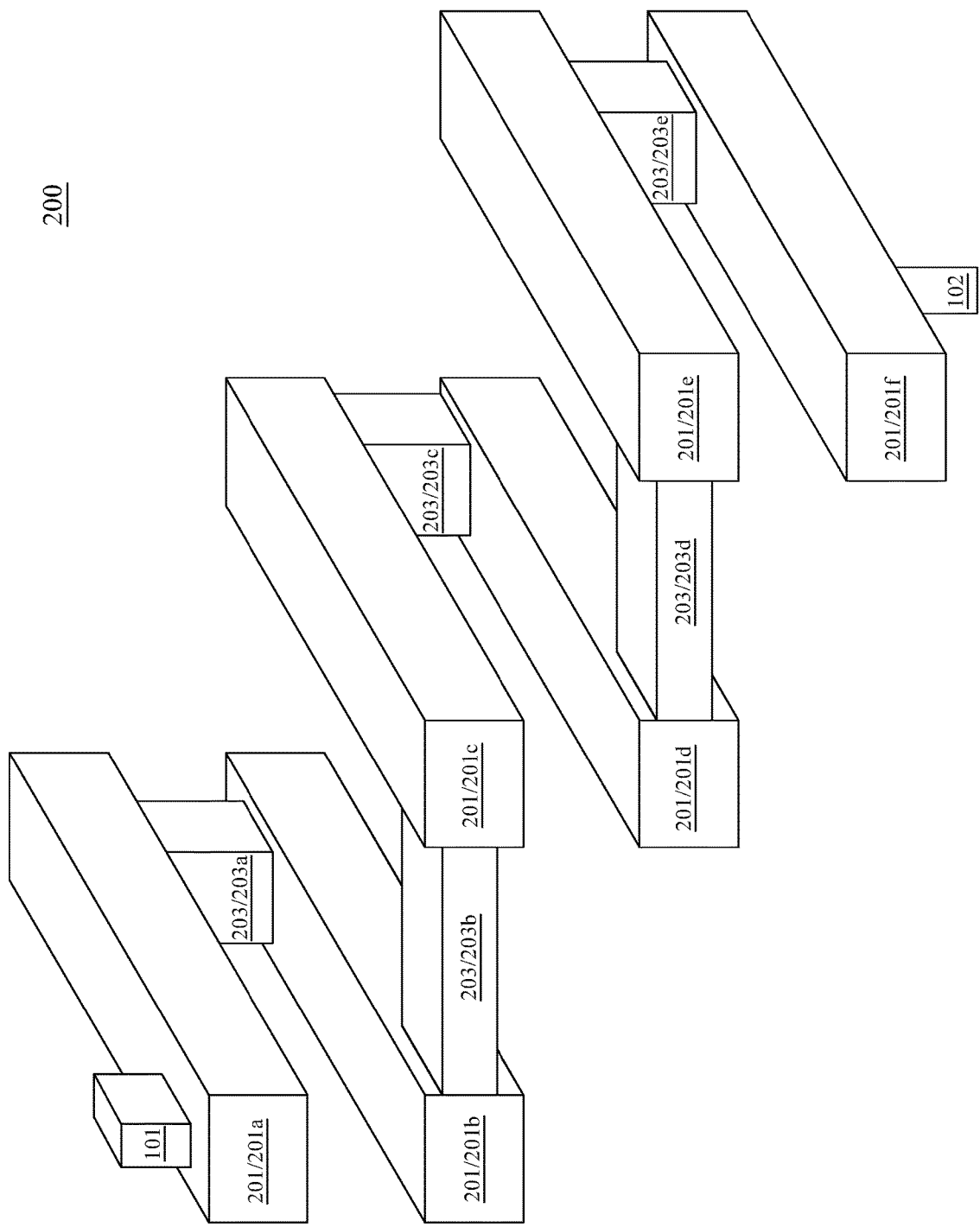
FIG. 15 is perspective view of a mixing unit according to one embodiment of the present invention.

In some embodiments, as shown in FIGS. 14 to 15, the mixing cartridge 201 includes six mixing chambers 201a, 201b, 201c, 201d, 201e, 201f. In some embodiments, as shown in FIG. 14, the first mixing chamber 201a is disposed over the second mixing chamber 201b, the second mixing chamber 201b is disposed over the third mixing chamber 201c, the third mixing chamber 201c is disposed over the fourth mixing chamber 201d, the fourth mixing chamber 201d is disposed over the fifth mixing chamber 201e, and the fifth mixing chamber 201e is disposed over the sixth mixing chamber 201f. In some embodiments, the first mixing chamber 201a, the second mixing chamber 201b, the third mixing chamber 201c, the fourth mixing chamber 201d, the fifth mixing chamber 201e and the sixth mixing chamber 201f are vertically aligned with each other. In some embodiments, the polymeric material, the blowing agent and the mixture thus obtained are flowable downwardly from the inlet 101 to the outlet 102 along the first mixing chamber 201a, the first passage 203a, the second mixing chamber 201b, the second passage 203b, the third mixing chamber 201c, the third passage 203c, the fourth mixing chamber 201d, the fourth passage 203d, the fifth mixing chamber 201e, the fifth passage 203e, and the sixth mixing chamber 201f.

In some embodiments, each of a fifth mixing screw 202e and a sixth mixing screw 202f are rotatable relative to the fifth mixing chamber 201e and the sixth mixing chamber 201f respectively. In some embodiments, the fifth mixing screw 202e is not laterally movable relative to the fifth mixing chamber 201e during the rotation of the fifth mixing screws 202e. In some embodiments, the sixth mixing screw 202f is not laterally movable relative to the sixth mixing chamber 201f during the rotation of the sixth mixing screw 202f. In some embodiments, the polymeric material flows along the first direction X1 inside the first mixing chamber 201a, the third mixing chamber 201c and the fifth mixing chambers, and along the second direction X2 inside the second mixing chamber 201b, the fourth mixing chamber 201d, and the sixth mixing chamber 201f.

In some embodiments, the mixing unit 200 further includes a fifth port 204e coupled to the fifth mixing chamber 201e, wherein the fifth port 204e is configured to provide the blowing agent into the fifth mixing chamber 201e, and a sixth port 204f coupled to the sixth mixing chamber 201f, wherein the sixth port 204f is configured to provide the blowing agent into the sixth mixing chamber 201f.

In some embodiments, the first to sixth mixing chambers 201a, 201b, 201c, 201d, 201e, 201f can have same or different temperatures. The temperature of each of the first to sixth mixing chambers 201a, 201b, 201c, 201d, 201e, 201f is adjustable depending on various factors (e.g., types of the polymer raw material, the mixing of the polymeric material with the blowing agent, etc.). In some embodiments, during the conveying and the mixing, the first to sixth mixing chambers 201a, 201b, 201c, 201d, 201e, 201f can have pressures that are same as or different from each other.

In some embodiments as shown in FIG. 15, the first mixing chamber 201a is disposed over the second mixing chamber 201b, the third mixing chamber 201c is disposed over the fourth mixing chamber 201d, and the fifth mixing chamber 201e is disposed over the sixth mixing chamber 201f. In some embodiments, the second mixing chamber 201b and the third mixing chamber 201c are disposed parallel to each other, and the fourth mixing chamber 201d and the fifth mixing chamber 201e are disposed parallel to each other. In some embodiments, the polymeric material, the blowing agent and the mixture thus obtained are flowable horizontally and/or downwardly along the first mixing chamber 201a, the first passage 203a, the second mixing chamber 201b, the second passage 203b, the third mixing chamber 201c, the third passage 203c, the fourth mixing chamber 201d, the fourth passage 203d, the fifth mixing chamber 201e, the fifth passage 203e, and the sixth mixing chamber 201f.

Figure 16:
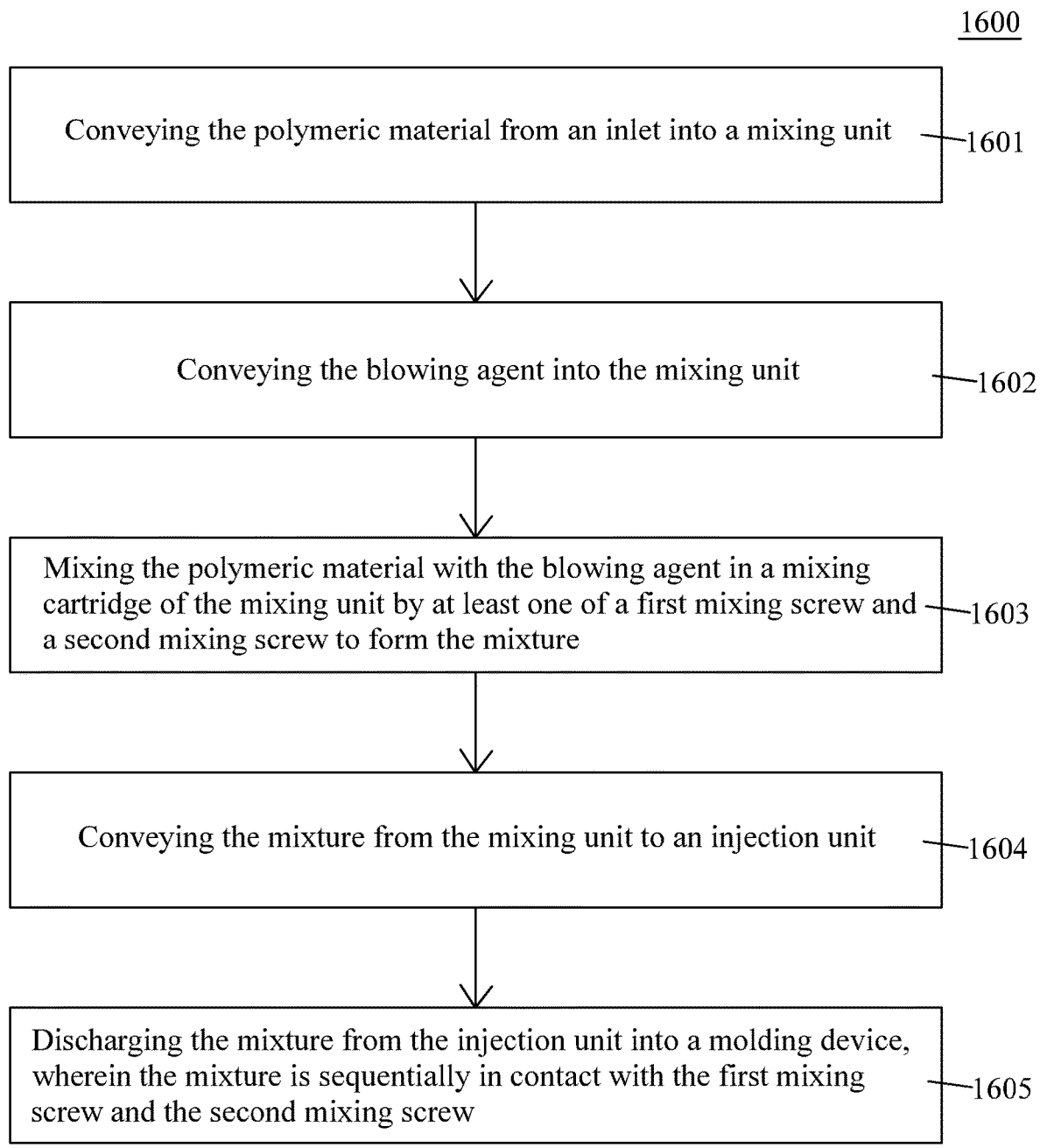
FIG. 16 is a flowchart illustrating a method of extruding a mixture of a polymeric material and a blowing agent according to one embodiment of the present invention.

In the present disclosure, a method of extruding a mixture of a polymeric material and a blowing agent is disclosed. In some embodiments, an extrusion is performed by the method. The method includes a number of operations and the description and illustrations are not deemed as a limitation of the sequence of the operations. FIG. 16 is a flowchart illustrating a method of extruding a mixture of a polymeric material and a blowing agent according to one embodiment of the present invention. In some embodiments, as shown in FIG. 16, the method of injection molding 1600 includes the following steps.

Step 1601 includes conveying the polymeric material from an inlet to a mixing unit.

Step 1602 includes conveying the blowing agent into the mixing unit.

Step 1603 includes mixing the polymeric material with the blowing agent in a mixing cartridge of the mixing unit by a first mixing screw and a second mixing screw to form the mixture.

Step 1604 includes conveying the mixture from the mixing unit to an injection unit.

Step 1605 includes discharging the mixture from the injection unit into a molding device.

The mixture is sequentially in contact with the first mixing screw and the second mixing screw.

The method 1600 is not limited to the above-mentioned embodiments. In some embodiments, the method 1600 uses any of the above-mentioned extruding systems 100 as shown in FIGS. 1 to 10.

In some embodiments, the method 1600 of extruding a mixture of a polymeric material and a blowing agent includes step 1601, which includes conveying the polymeric material from an inlet 101 to a mixing unit 200. In some embodiments, the polymeric material is conveyed from the inlet 101 to a mixing cartridge 201 of the mixing unit 200 as shown in FIGS. 1 to 15. In some embodiments, the polymeric material is conveyed from the inlet 101 to a first mixing chamber 201a of the mixing unit 200 as shown in FIGS. 7 to 15. In some embodiments, the method 1600 further includes monitoring the inlet 101 and the mixing unit 200 in real time.

In some embodiments, a sensor 501 of a monitoring module 500 senses that the polymeric material is conveyed from the inlet 101 to the mixing unit 200. In some embodiments, the sensor 501 continuously senses processing conditions, such as temperature and pressure in the mixing unit 200, and transmits a signal or data based on the detected processing conditions to the monitoring module 500 for further analysis.

In some embodiments, the method 1600 includes step 1602, which includes conveying the blowing agent into the mixing unit 200. In some embodiments, the blowing agent is conveyed from a port 204 to the mixing cartridge 201 of the mixing unit 200. In some embodiments, the blowing agent is conveyed from the port 204 to the first mixing chamber 201a of the mixing unit 200 as shown in FIGS. 1 to 15. In some embodiments, the blowing agent is conveyed from ports 204 to the mixing chambers 201a, 201b, 201c, 201d, 201e, 201f of the mixing unit 200 as shown in FIGS. 7 to 15.

In some embodiments, as shown in FIGS. 1 to 3 and 7 to 10, the method 1600 includes step 1603, which includes mixing the polymeric material with the blowing agent in the mixing cartridge 201 of the mixing unit 200 by a first mixing screw 202a and a second mixing screw 202b to form the mixture.

In some embodiments, the polymeric material and the blowing agent are mixed by rotation of the mixing screws 202, wherein each of the mixing screws 202 has an L:D ratio greater than 24:1, preferably greater than 25:1, more preferably greater than 50:1, and more preferably greater than 75:1. In some embodiments, each of the mixing screws 202 is immovable in a direction parallel to the longitudinal axis of the mixing cartridge 201.

In some embodiments, as shown in FIG. 7 to 10, the mixture is conveyed from the first mixing chamber 201a to the second mixing chamber 201b of the mixing cartridge 201, and mixed by the first and second mixing screws 202a, 202b disposed in the first and second mixing chambers 201a, 201b, respectively. In some embodiments, the conveying of the mixture includes conveying the mixture by the first mixing screw 202a along a first direction X1, and conveying the mixture by the second mixing screw 202b along a second direction X2 opposite to the first direction X1. In some embodiments, the mixture is in contact with the first mixing chamber 201a and the second mixing chamber 201b sequentially. In some embodiments, the mixture is conveyed along the first direction X1 upon rotation of the first mixing screw 202a, and the mixture is conveyed along the second direction X2 upon rotation of the second mixing screw 202b. In some embodiments, the mixture is mixed in the first mixing chamber 201a and the second mixing chamber 201b simultaneously.

In some embodiments, the mixture is conveyed from the first mixing chamber 201a to the second mixing chamber 201b through a first passage 203a located between and connecting the first mixing chamber 201a and the second mixing chamber 201b. In some embodiments, a flow control element 206 disposed at the connecting passage 203a is at an open configuration when the mixture passes through the connecting passage 203a. In some embodiments, a first flow control element 206a disposed at the first passage 203a is at an open configuration when the mixture passes through the first passage 203a.

In some embodiments, the mixture in the mixing cartridge 201 is conveyed to the outlet 102 by rotation of the first mixing screw 202a and the second mixing screw 202b, sequentially. The mixture travels along the first mixing screw 202a and then along the second mixing screw 202b.

In some embodiments, a pressure difference is generated between the first and second mixing chambers 201a, 201b. In some embodiments, the first mixing chamber 201a has a first pressure, and the second mixing chamber 201b has a second pressure different from the first pressure. In some embodiments, the mixture is conveyed and/or drawn from the first mixing chamber 201a to the second mixing chamber 201b through the first passage 203a by a pressure difference between the first pressure and the second pressure. In some embodiments, the flow control element 206 maintains the pressure difference in the mixing cartridge 201. In some embodiments, the first flow control element 206a is in a closed configuration when the first pressure is similar to the second pressure.

In some embodiments, a sensor 501 of a monitoring module 500 senses that the first pressure is greater than the second pressure. In some embodiments, the sensor 501 continuously senses the pressure throughout the mixing unit 200, and transmits a signal or data, based on the detected processing condition, to the monitoring module 500 for further analysis.

In some embodiments, a temperature difference is generated between the first and second mixing chambers 201a, 201b. In some embodiments, the first mixing chamber 201a has a first temperature, and the second mixing chamber 201b has a second temperature different from the first temperature.

Similarly, in some embodiments, as shown in FIGS. 11 to 13, the mixture is mixed in the first, second, third and fourth mixing chambers 201a, 201b, 201c, 201d of the mixing cartridge 201, and the first, second, third and fourth mixing screws 202a, 202b, 202c, 202d are disposed in the first, second, third and fourth mixing chambers 201a, 201b, 201c, 201d, respectively. In some embodiments, the mixture is in contact with the first, second, third and fourth mixing screws 202a, 202b, 202c, 202d sequentially. In some embodiments, the mixture is mixed in the first, second, third and fourth mixing chambers 201a, 201b, 201c, 201d, simultaneously.

In some embodiments, the mixture is conveyed from the first mixing chamber 201a to the second mixing chamber 201b through a first passage 203a located between and connecting the first mixing chamber 201a and the second mixing chamber 201b, then conveyed from the second mixing chamber 201b to the third mixing chamber 201c through a second passage 203b located between and connecting the second mixing chamber 201b and the third mixing chamber 201c, and then conveyed from the third mixing chamber 201c to the fourth mixing chamber 201d through a third passage 203c located between and connecting the third mixing chamber 201c and the fourth mixing chamber 201d. In some embodiments, a second flow control element 206b disposed at the second passage 203b is at an open configuration when the mixture passes through the second passage 203b. In some embodiments, a third flow control element 206c disposed at the third passage 203c is at an open configuration when the mixture passes through the third passage 203c.

In some embodiments, the mixture in the mixing cartridge 201 is conveyed to the outlet 102 by rotation of the first mixing screw 202a, the second mixing screw 202b, the third mixing screw 202c, and the fourth mixing screw 202d, sequentially. The mixture travels along the first mixing screw 202a, the second mixing screw 202b, the third mixing screw 202c, and then the fourth mixing screw 202d.

In some embodiments, a pressure difference is generated between the first, second, third and fourth mixing chambers 201a, 201b, 201c, 201d. In some embodiments, a temperature difference is generated between the first, second, third and fourth mixing chambers 201a, 201b, 201c, 201d.

In some embodiments, the method 1600 includes step 1604, which includes conveying the mixture from the mixing unit 200 to an injection unit 300.

In some embodiments, as shown in FIGS. 1, 2, 4, 7, 11 and 14, the mixture is conveyed from the mixing cartridge 201 into an injector 301 of the injection unit 300. In some embodiments, the mixture accumulates in the injector 301 of the injection unit 300. In some embodiments, the mixture is conveyed from the mixing cartridge 201 of the mixing unit 200 to the injector 301 of the injection unit 300 through an outlet 102 by rotation of the mixing screws 202 disposed in the mixing cartridge 201. In some embodiments, the outlet 102 is disposed at one end of the mixing cartridge 201.

In some embodiments, the method 1600 includes step 1605, which includes discharging the mixture from the injection unit 300 into a molding device 400. In some embodiments, a predetermined amount of the mixture is discharged from the injection unit 300 into the molding device 400. In some embodiments, the mixture is discharged from a nozzle 302 coupled to the injector 301, and then injected into the molding cavity 401 through a feeding passage 402 of the molding device 400.

As illustrated in FIGS. 1, 2, 4, 7, 11 and 14, in some embodiments, a pushing force provided toward the nozzle 302 forces the predetermined amount of the mixture out of the injection unit 300. In some embodiments, the mixture is forced from the injection unit 300 through the nozzle 302. In some embodiments, before the mixture is forced from the injection unit 300, the nozzle 302 engages with the feeding passage 402 of the molding device 400, and the mixture is discharged from the injection unit 300.

In some embodiments, the predetermined amount of the mixture is determined by a monitoring module 500. In some embodiments, a sensor 501 continuously senses the processing conditions in the injection unit 300, and transmits a signal or data, based on the detected processing condition, to the monitoring module 500 for further analysis, such as determining the amount of the mixture and the duration of the injection.

An aspect of this disclosure relates to an extruding system. The extruding system includes a mixing unit configured to mix a polymeric material with a blowing agent and to form a mixture of the polymeric material and the blowing agent; and an injection unit coupled to the mixing unit and configured to inject the mixture. The mixing unit includes a mixing cartridge, a first mixing screw and a second mixing screw, the first and second mixing screws are disposed in the mixing cartridge.

In some embodiments, the first mixing screw is disposed above the second mixing screw. In some embodiments, the first mixing screw and the second mixing screw are horizontally aligned with each other. In some embodiments, the mixing cartridge includes a first mixing chamber and a second mixing chamber, and the first and second mixing screws are disposed in the first and second mixing chambers, respectively. In some embodiments, the mixing unit further includes a connecting passage communicating with the first mixing chamber and the second mixing chamber. In some embodiments, the first mixing chamber has a first pressure, and the second mixing chamber has a second pressure different from the first pressure. In some embodiments, the first mixing chamber has a first temperature, and the second mixing chamber has a second temperature different from the first temperature. In some embodiments, the mixing unit further includes a flow control element configured to allow or prevent the mixture of the polymeric material and the blowing agent flowing between the first mixing chamber and the second mixing chamber.

In some embodiments, the flow control element is configured to maintain a pressure difference between the first mixing chamber and the second mixing chamber. In some embodiments, the first mixing screw and the second mixing screw are rotatable relative to the mixing cartridge. In some embodiments, each of the first mixing screw and the second mixing screw has a length to diameter ratio greater than or equal to 25:1. In some embodiments, the first mixing screw extends along a first direction and the second mixing screw extends along a second direction different from the first direction. In some embodiments, the first direction and the second direction are opposite to each other. In some embodiments, the extruding system further includes a monitoring module configured to monitor the extruding system in real time, wherein the monitoring module includes a sensor disposed in the extruding system.

An aspect of this disclosure relates to a method of extruding a mixture of a polymeric material and a blowing agent. The method includes conveying the polymeric material from an inlet into a mixing unit; conveying the blowing agent into the mixing unit; mixing the polymeric material with the blowing agent in a mixing cartridge of the mixing unit by at least one of a first mixing screw and a second mixing screw to form the mixture; conveying the mixture from the mixing unit to an injection unit; and discharging the mixture from the injection unit into a molding device. The mixture is sequentially in contact with the first mixing screw and the second mixing screw.

In some embodiments, the mixture is mixed in a first mixing chamber and a second mixing chamber of the mixing cartridge, and the first and second mixing screws are disposed in the first and second mixing chambers, respectively. In some embodiments, the mixture is mixed in the first mixing chamber and the second mixing chamber simultaneously. In some embodiments, the conveying of the mixture includes conveying the mixture by the first mixing screw along a first direction, and conveying the mixture by the second mixing screw along a second direction opposite to the first direction. In some embodiments, the mixture is conveyed along the first direction upon rotation of the first mixing screw, and the mixture is conveyed along the second direction upon rotation of the second mixing screw. In some embodiments, the method further includes generating a pressure difference between the first and second mixing chambers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:
1. An extruding system, comprising:
a mixing unit configured to mix a polymeric material with a blowing agent and to form a mixture of the polymeric material and the blowing agent;
an injection unit coupled to the mixing unit and configured to inject the mixture; and
a molding device disposed under the mixing unit and the injection unit,
wherein the mixing unit includes a mixing cartridge, a first mixing chamber in the mixing cartridge, a second mixing chamber in the mixing cartridge, a third mixing chamber in the mixing cartridge, a first mixing screw having at least two groove portions different from each other in curvatures and longitudinally extending in the first mixing chamber in a first direction, a second mixing screw having at least two groove portions different from each other in curvatures and longitudinally extending in the second mixing chamber in the first direction, a third mixing screw having at least two groove portions different from each other in curvatures and longitudinally extending in the third mixing chamber in the first direction,
a first port coupled to the first mixing chamber, disposed between the at least two groove portions of the first mixing screw and configured to provide the blowing agent into the first mixing chamber, a second port coupled to the second mixing chamber, disposed between the at least two groove portions of the second mixing screw and configured to provide the blowing agent into the second mixing chamber, and a third port coupled to the third mixing chamber, disposed between the at least two groove portions of the third mixing screw and configured to provide the blowing agent in to the third mixing chamber, wherein the first mixing chamber is horizontally aligned with the second mixing chamber, the first mixing chamber and the second mixing chamber are disposed over the third mixing chamber, the mixture is conveyable within and along the mixing cartridge to sequentially in contact with the at least two groove portions of the first mixing screw, the at least two groove portions of the second mixing screw, and the at least two groove portions of the third mixing screw and to sequentially pass through the first port, the second port and the third port, the mixture is flowable downwardly and sequentially along the first mixing chamber, the second mixing chamber and the third mixing chamber, the molding device includes a feeding passage and a molding cavity in communication with the feeding passage, and the feeding passage extends in a second direction perpendicular to the third mixing screw, the injection unit is vertically extended between the mixing unit and the molding device in the direction perpendicular to the first direction, the first mixing screw, the second mixing screw and the third mixing screw are substantially orthogonal to the injection unit, and a first length to diameter (L:D) ratio of the first mixing screw, a second L:D ratio of the second mixing screw and a third L:D ratio of the third mixing screw are same as each other.

2. The extruding system of claim 1, wherein the second mixing chamber is vertically aligned with the third mixing chamber.

3. The extruding system of claim 1, wherein an end of the mixing cartridge is connected to an inlet for receiving the polymeric material, and an opposite end of the mixing cartridge is connected to an outlet for discharging the mixture.

4. The extruding system of claim 1, wherein the first mixing screw includes a column-like body, a first groove portion annularly arranged on the periphery of the column-like body at one end of the first mixing screw, and a second groove portion annularly arranged on the periphery of the column-like body at the other end of the first mixing screw, the first groove portion and the second groove portion have a plurality of grooves of different curvatures, respectively.

5. The extruding system of claim 1, wherein the mixing unit further includes a first passage in the mixing cartridge bridging the first mixing chamber and the second mixing chamber, the first mixing chamber is communicable with the second mixing chamber via the first passage.

6. The extruding system of claim 1, wherein the mixing unit includes a plurality of inlets configured to supply the polymeric material into the mixing cartridge.

7. The extruding system of claim 1, wherein the first port, the second port and the third port are in same number of ports.

8. The extruding system of claim 1, wherein the mixing unit further includes a flow control element configured to allow or prevent the mixture of the polymeric material and the blowing agent flowing between the first mixing chamber and the second mixing chamber.

9. The extruding system of claim 1, wherein the first mixing chamber is configured to convey the mixture by the first mixing screw along the first direction, the second mixing chamber is configured to convey the mixture by the second mixing screw along a second direction opposite to the first direction, and the third mixing chamber is configured to convey the mixture by the third mixing screw along the first direction.

10. The extruding system of claim 1, wherein the first mixing screw and the second mixing screw are rotatable relative to the mixing cartridge.

11. The extruding system of claim 1, wherein the first L:D ratio, the second L:D ratio and the third L:D ratio are respectively greater than or equal to 25:1.

12. The extruding system of claim 1, wherein the third mixing screw is immovable in a direction parallel to a longitudinal axis of the third mixing chamber during the rotation of the third mixing screw.

13. The extruding system of claim 1, further comprising a monitoring module configured to monitor the extruding system in real time, wherein the monitoring module includes a sensor disposed in the extruding system, the sensor continuously senses a first pressure of the first mixing chamber and a second pressure of the second mixing chamber, and the monitoring module automatically monitors and instantly adjusts the first pressure and the second pressure.

14. The extruding system of claim 7, wherein the blowing agent is provided into the mixing cartridge sequentially through the first port, the second port and the third port.

15. An extruding system, comprising:
a mixing unit configured to mix a polymeric material with a blowing agent and to form a mixture of the polymeric material and the blowing agent, the mixing unit includes a mixing cartridge, a first mixing chamber longitudinally extending in the mixing cartridge, a second mixing chamber longitudinally extending in the mixing cartridge, a third mixing chamber longitudinally extending in the mixing cartridge, a first mixing screw having at least two groove portions different from each other in curvatures and disposed in the first mixing chamber in a first direction, a second mixing screw having at least two groove portions different from each other in curvatures and disposed in the second mixing chamber in the first direction, a third mixing screw having at least two groove portions different from each other in curvatures and disposed in the third mixing chamber in the first direction;
a first port coupled to the first mixing chamber, disposed between the at least two groove portions of the first mixing screw and configured to provide the blowing agent into the first mixing chamber,
a second port coupled to the second mixing chamber, disposed between the at least two groove portions of the second mixing screw and configured to provide the blowing agent into the second mixing chamber;
a third port coupled to the third mixing chamber, disposed between the at least two groove portions of the third mixing screw and configured to provide the blowing agent in to the third mixing chamber, and
an injection unit coupled to the mixing unit and configured to inject the mixture; and
a molding device disposed under the mixing unit and the injection unit,
wherein the first mixing chamber is disposed over and vertically aligned with the second mixing chamber, the second mixing chamber is horizontally aligned with and substantially coplanar with the third mixing chamber, the mixture is conveyable within and along the mixing cartridge to sequentially in contact with the at least two groove portions of the first mixing screw, the at least two groove portions of the second mixing screw and the at least two groove portions of the third mixing screw and to sequentially pass through the first port, the second port and the third port, the mixture is flowable downwardly and sequentially along the first mixing chamber and the second mixing chamber, the molding device includes a feeding passage and a molding cavity in communication with the feeding passage, and the feeding passage extends in a second direction perpendicular to the third mixing screw, the injection unit is vertically extended between the mixing unit and the molding device in the second direction perpendicular to the first direction and includes a nozzle engageable with the feeding passage and is configured to inject the mixture in the direction perpendicular to the third mixing screw, the first mixing chamber, the second mixing chamber and the third mixing chamber are substantially orthogonal to the injection unit, and the first mixing chamber has a first pressure, the second mixing chamber has a second pressure, the third mixing chamber has a third pressure, the first pressure is greater than the second pressure, and the second pressure is greater than the third pressure.

16. The extruding system of claim 15, wherein the mixing unit further includes an inlet connected to an end of the mixing cartridge, an outlet connected to an opposite end of the mixing cartridge, the first mixing screw is disposed adjacent to the inlet, and the third mixing screw is disposed adjacent to the outlet.

17. The extruding system of claim 16, wherein the outlet is disposed between the mixing cartridge and the injection unit.

18. The extruding system of claim 15, wherein the first mixing screw, the second mixing screw and the third mixing screw are immovable in the first direction during the rotation of the first mixing screw, the second mixing screw and the third mixing screw respectively.

19. The extruding system of claim 15, wherein the mixing cartridge includes a first end, a second end, a first middle end between the first end and the second end, and a second middle end between the first middle end and the second end, the first end and the second middle end are disposed at the same side of the mixing cartridge, and the first middle end and the second end are disposed opposite to the first end and the second middle end.

20. The extruding system of claim 15, wherein the second mixing chamber and the third mixing chamber are disposed between the first mixing chamber and the injection unit.

21. The extruding system of claim 15, wherein a first length to diameter (L:D) ratio of the first mixing screw, a second L:D ratio of the second mixing screw and a third L:D ratio of the third mixing screw are same as each other.

* * * * *